United States Patent [19]

Sukonick

[11] 4,442,495

[45] Apr. 10, 1984

[54] REAL TIME TOROIDAL PAN

[75] Inventor: Josef Sukonick, Cupertino, Calif.

[73] Assignee: Cadtrak Corporation, Sunnyvale, Calif.

[21] Appl. No.: 274,355

[22] Filed: Jun. 17, 1981

Related U.S. Application Data

[63] Continuation-in-part of Ser. No. 125,238, Feb. 27, 1980, abandoned.

[51] Int. Cl.$^3$ .............................................. G06F 3/153

[52] U.S. Cl. .................................... 364/521; 340/726; 340/792; 340/799

[58] Field of Search ................ 364/521; 340/709, 711, 340/720, 723, 724, 726, 792, 799

[56] References Cited

U.S. PATENT DOCUMENTS

| | | | |
|---|---|---|---|
| 3,614,766 | 10/1971 | Kievit | 340/726 |
| 3,742,482 | 6/1973 | Albrecht et al. | 340/792 X |
| 3,903,510 | 9/1975 | Zobel | 340/799 X |
| 4,129,859 | 12/1978 | Iwamura et al. | 340/724 X |
| 4,196,430 | 4/1980 | Denko | 340/726 |
| 4,197,590 | 4/1980 | Sukonick et al. | 340/799 X |

*Primary Examiner*—Jerry Smith

*Attorney, Agent, or Firm*—Spensley, Horn, Jubas & Lubitz

[57] ABSTRACT

This video graphics raster display system effectively facilitates panning over an image that is arbitrarily larger than the image memory from which the display is generated. To accomplish this, the image memory is addressable "toroidally", i.e., in modulo or wraparound fashion. Thus, if a memory address boundary is reached during a raster readout, the readout continues without interruption from the opposite boundary.

The image memory is slightly larger than would be required to store only the image currently being displayed. The excess memory area includes a border area, surrounding the current readout area, which contains image data that forms a continuation of the image currently being read out and displayed. This allows immediate panning into the border area. Further, the excess memory area includes a "rewrite area" on the other side of the border zone from the current readout area into which new, image continuation data may be entered while panning takes place. Appropriate circuitry facilitates new data entry to the rewrite area and controls the panning rate to ensure that the displayed image will not reach the rewrite area until after the new data has been entered.

28 Claims, 25 Drawing Figures

FIG. 1. IMAGE MEMORY ORGANIZATION
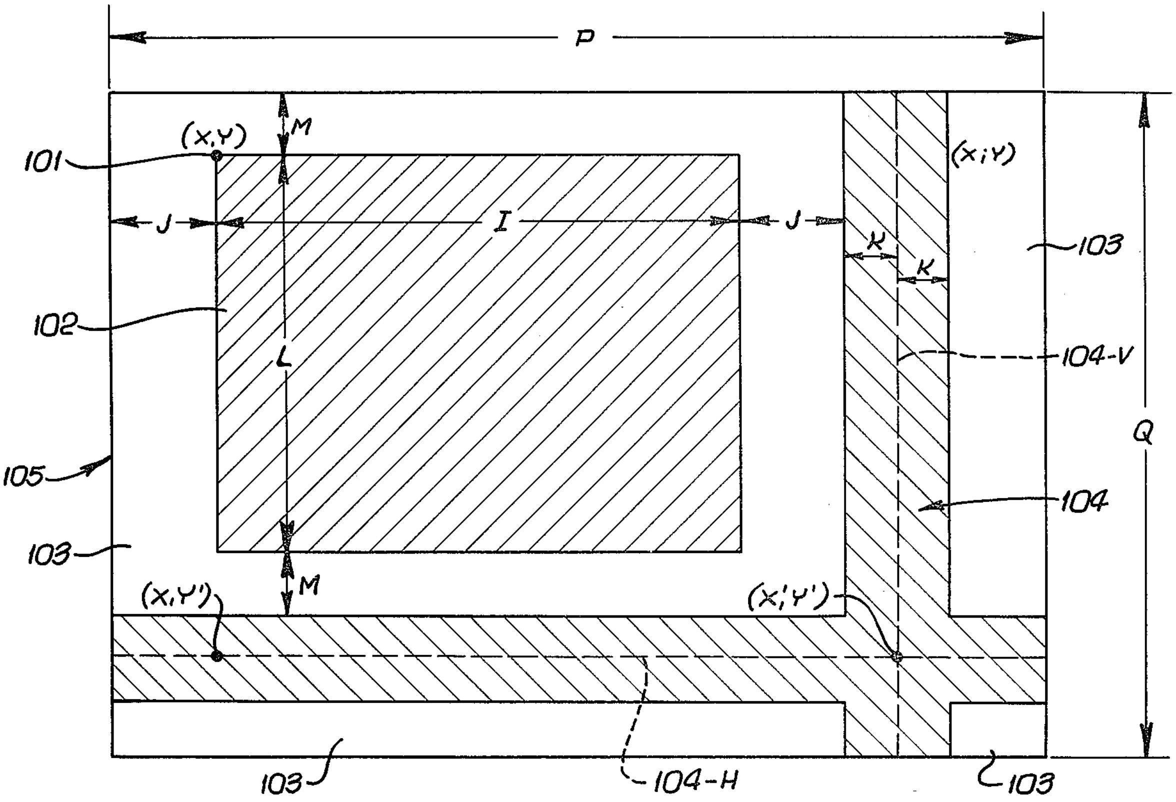
FIG. 12.
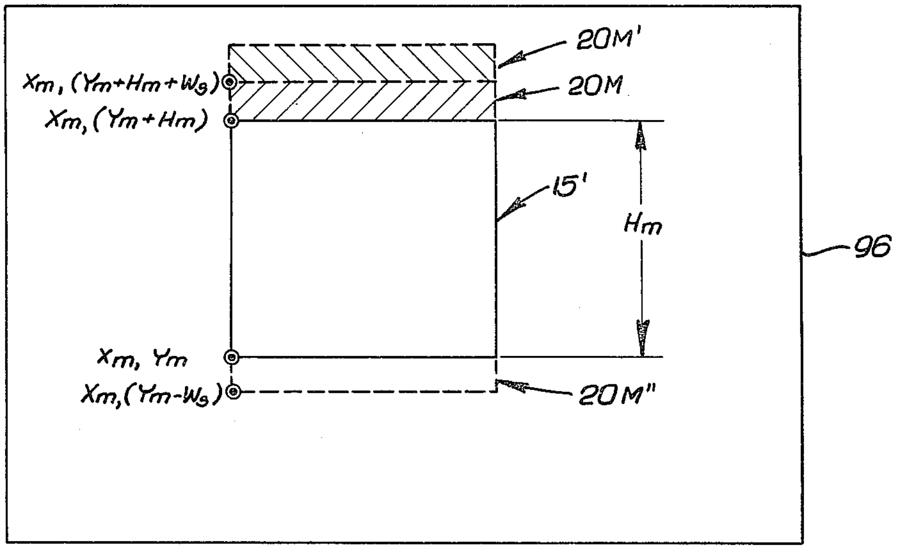

FIG. 2A. TOROIDAL ORGANIZATION OF IMAGE MEMORY
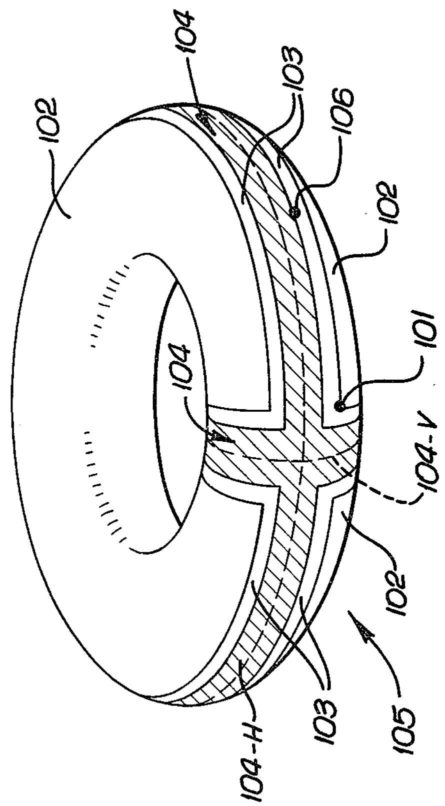
FIG. 2B.
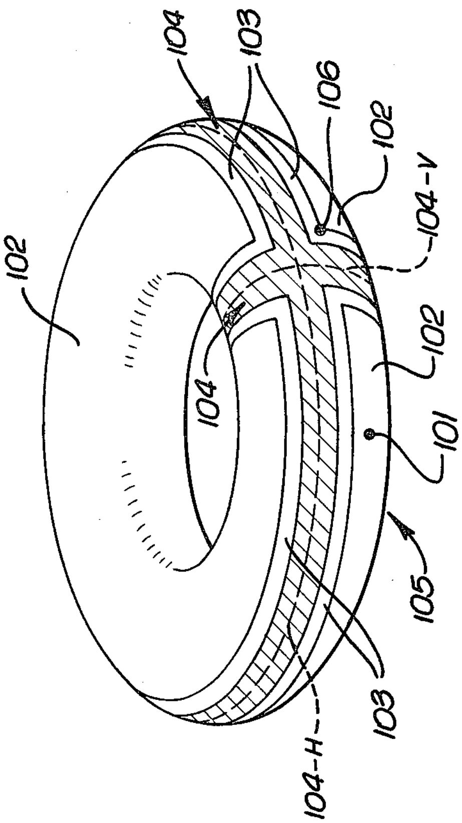

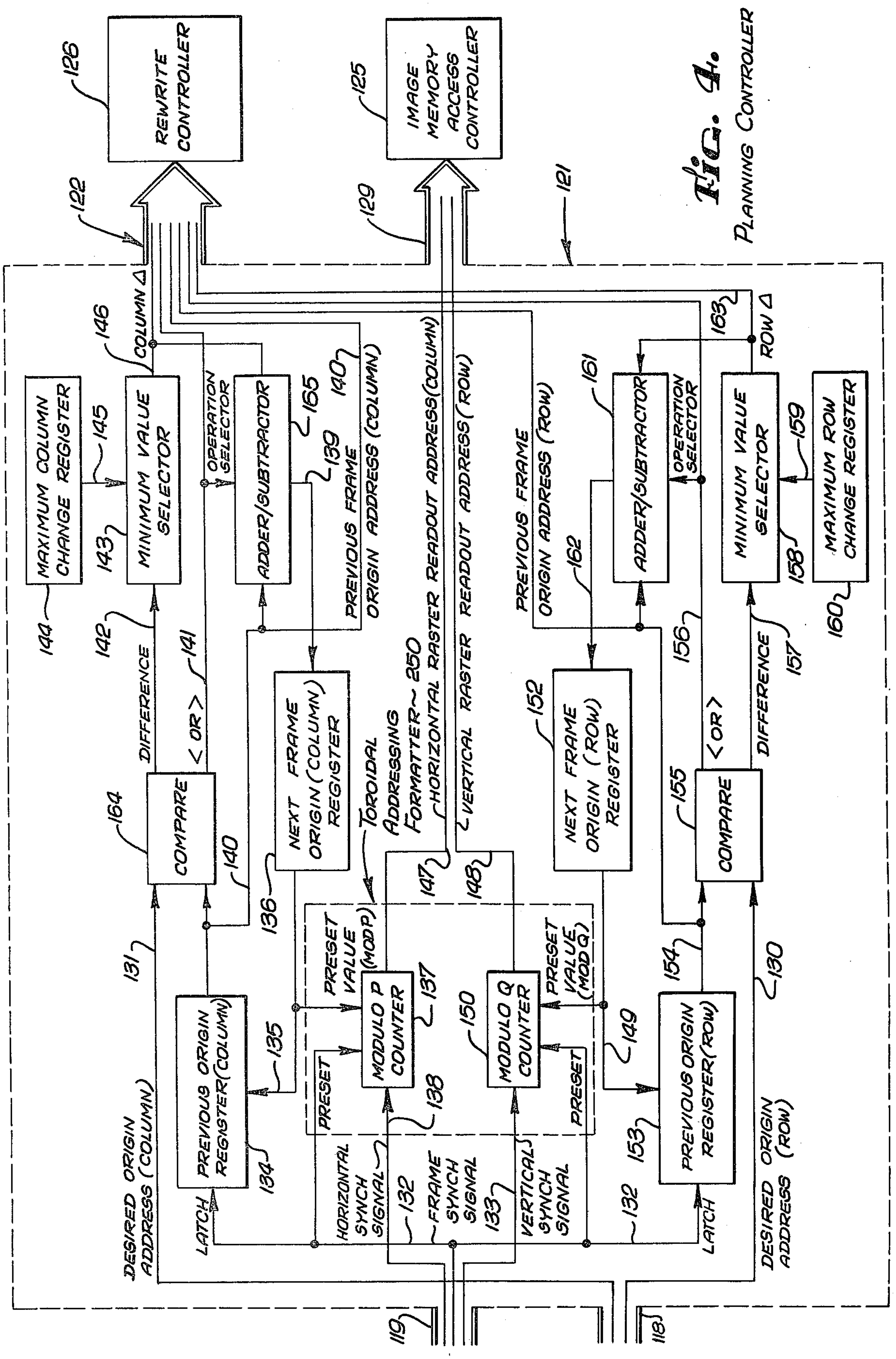
FIG. 4. PLANNING CONTROLLER

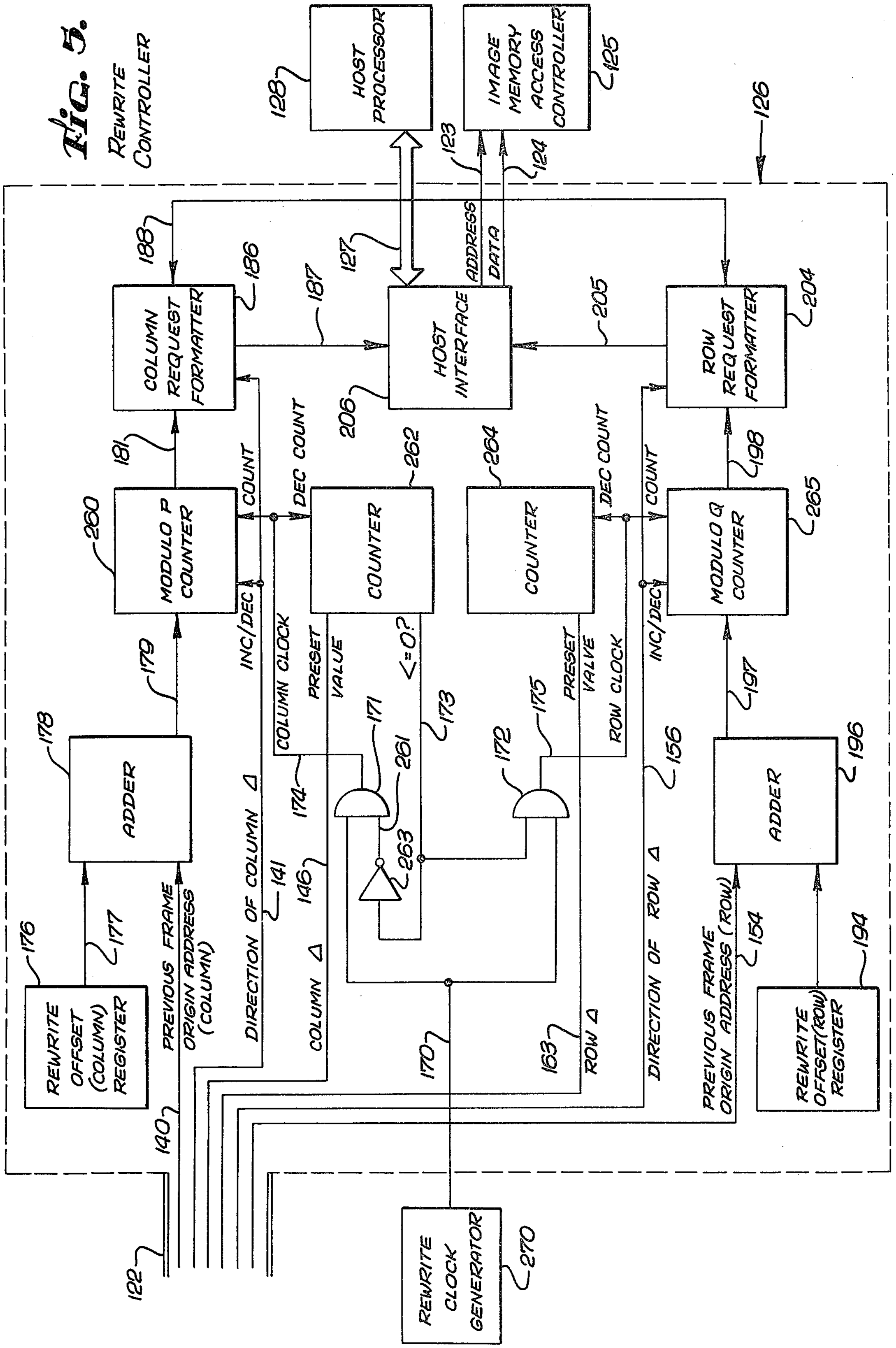
FIG. 5.
REWRITE CONTROLLER
HOST PROCESSOR
128
IMAGE MEMORY ACCESS CONTROLLER
125
123
124
126
ADDRESS
DATA
127
188
COLUMN REQUEST FORMATTER
186
187
HOST INTERFACE
206
205
ROW REQUEST FORMATTER
204
181
COUNT
DEC COUNT
262
264
DEC COUNT
COUNT
198
MODULO P COUNTER
260
COUNTER
COUNTER
MODULO Q COUNTER
265
179
INC/DEC
COLUMN CLOCK
PRESET VALUE
<=0?
PRESET VALVE
ROW CLOCK
INC/DEC
197
178
ADDER
171
261
173
175
172
156
ADDER
196
174
263
DIRECTION OF COLUMN Δ
141
146
DIRECTION OF ROW Δ
176
177
PREVIOUS FRAME ORIGIN ADDRESS (COLUMN)
COLUMN Δ
170
163
ROW Δ
PREVIOUS FRAME ORIGIN ADDRESS (ROW)
154
194
REWRITE OFFSET (COLUMN) REGISTER
REWRITE OFFSET(ROW) REGISTER
140
122
REWRITE CLOCK GENERATOR
270

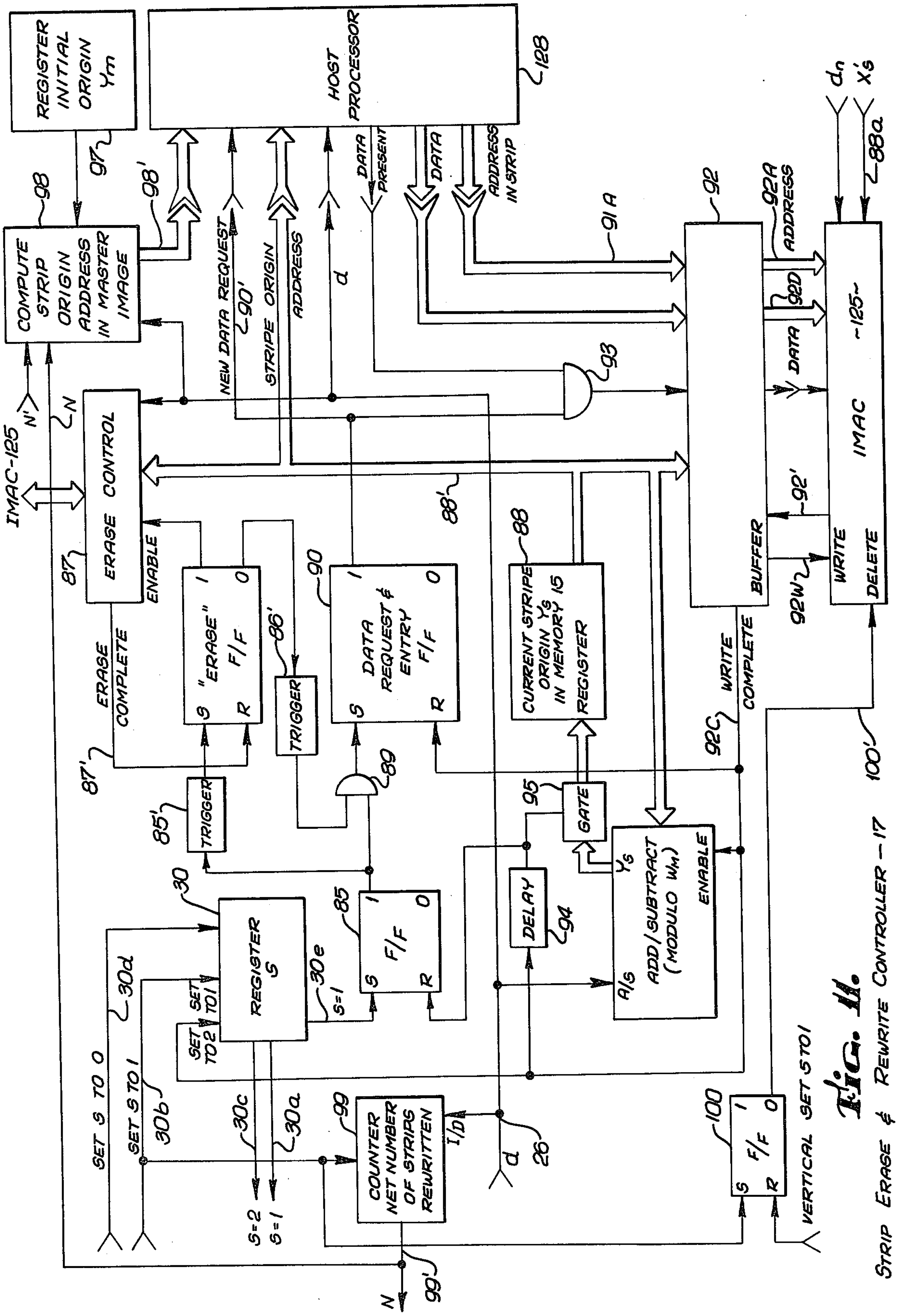
FIG. 11. STRIP ERASE & REWRITE CONTROLLER — 17

NORMAL PANNING

FAST PANNING

REAL TIME TOROIDAL PAN

This is a continuation-in-part of U.S. Ser. No. 125,238, filed Feb. 27, 1980, now abandoned.

BACKGROUND OF THE INVENTION

1. Field of the Invention

The invention relates to an apparatus for providing a panning effect in a raster scan video display system, and specifically for implementing a toroidal pan in an image memory.

2. Description of the Prior Art

Graphic display terminals are increasingly used for display of computer generated pictorial information. By displaying such information on a cathode ray tube (CRT) display screen, the user can view the pictorial image essentially as soon as it is generated by the host computer. This is particularly advantageous when performing computer assisted design work, since changes in a design can be displayed pictorially as soon as they are made. By providing zoom and pan capabilities, the operator is aided in the use of the video display system. Panning is the shifting of the displayed portion of an image to adjacent portions of the image. This feature allows the operator of the video display system to smoothly move the "display window" provided by the CRT across a larger image which itself could not be completely displayed at one time on the CRT.

CRT based graphic display terminal systems fall into two fundamental classes: raster scan and vector generated displays. In a vector generated CRT graphic display terminal, the image is decomposed into a list of lines which are individually drawn by the electron beam of the CRT during each image refresh on the CRT. As the drawing increases in complexity, thereby increasing the number of lines to be drawn, the rate at which the image can be drawn decreases due to the limitation in the number of lines which may be drawn by the system in a given time.

A raster scan CRT graphic display terminal system, such as disclosed in U.S. Pat. No. 4,070,710 to J. Sukonick, et al., works on a principle similar to that of the household television. The face of the CRT screen is painted by the CRT's electron beam in a series of horizontal lines. The intensity of the electron beam is modulated as the CRT screen is scanned to provide varying intensities of light or color on the screen, thereby forming the desired image. In contrast to the vector scan system, a raster scan system for displaying images on a CRT provides a unvarying image generation load since the raster scan is a repetitive operation, repeated usually about 60 times per second, which is unaffected by the complexity of the image being displayed.

Raster scan graphic display systems typically contain an image memory in which digitized information as to the image to be displayed is stored. One or more memory cells in the image memory contains information concerning color, intensity, position, and other parameters for an element of the image. The smallest element for which information is stored is commonly called a pixel (picture element). A raster readout apparatus is usually provided to coordinate the fetching of pixel information from the image memory with the raster scan and to reformat the information into a composite video signal for use in controlling the CRT.

Use of such an image memory allows for the generation of special effects on the CRT. For instance, a background grid for the image is easily provided by associated circuitry. Additionally, a zoom feature, i.e., magnification of an image, can be created by using information concerning one pixel for several adjacent positions on the raster scan. An additional effect possible on such systems is that of panning, i.e., apparent movement of the image being displayed across a larger image.

Typically, graphic display terminals use a 12 inch or 15 inch CRT tube to present the image being displayed. Inasmuch as such devices may be used to display full size blueprints of many inches in width and length, the CRT operator is at a disadvantage in that he cannot simultaneously inspect or view the entire image, i.e., blueprint, on the CRT based system. The cost of providing a CRT with a display surface the same size as that of a blueprint is exorbitantly expensive or even technologically impossible at this time. Panning is an operator aid which compensates for the disadvantages caused by the small CRT screen. Even though an image of 40 inches or 50 inches in length or width can not be simultaneously displayed on the CRT screen, panning allows the operator to move the display window provided by the CRT as he desires from one portion of the image to another. This facility, in conjunction with the multiple advantages a CRT based graphic display terminal system offers, such as real time modification of images, have been fundamental to the success of such systems.

Typically, the operator controls the panning effect via a keyboard into which panning commands may be entered, or a "joy stick". A joy stick is a lever which can be moved by the operator in two dimensions and is used to convey positional or directional information to the graphic display system in a convenient manner.

There are several methods used in the prior art for providing a panning effect. One method is to rewrite the entire image memory between consecutive raster scans. The information rewritten into the image memory would form a slightly displaced image on the CRT, giving the effect of a slight pan of the image. The rewriting would continue between consecutive raster scans, giving the desired panning effect. The major disadvantage of this technique is that it is technologically difficult to rewrite the entire display image in the image memory between raster scans, about 1 msec. High speed image memory and complex digital logic are required to rewrite the image memory in the short CRT vertical retrace period of time between raster scans.

An alternative scheme used in the prior art is that based on double buffering the image memory. Two image memories, each able to store information sufficient for an entire raster scan, are provided. When a pan command is received, the image data for the image to be used by the next raster scan is written into the alternate image memory. During the raster scan from the alternate image memory, the first image memory may be suitably updated with an additionally displaced image. This alternation of image memories for each raster scan continues until the desired destination of the panning command is reached. This scheme also has several disadvantages. It, of course, requires twice as much image memory to be provided in the video display system. Additionally, the circuitry must be designed so that it may operate at a rate sufficient to rewrite data on an image into the appropriate image memory within the time consumed by one raster scan, e.g., 17 msec or 1/60 of a second. Although not nearly as demanding as the first mentioned scheme, high speed memory and digital logic circuitry must be used in order to provide the capability of rewriting an entire image memory within the allotted time.

A third method used in the prior art for providing a panning effect in raster scan video display systems is to provide image memory sufficient to store a larger portion of the image than which can be simultaneously displayed. When a panning command is received, the information is read out in raster fashion from a different part of the image memory. Such a scheme has the advantage that within the limits of the image memory, panning can be as fast as desired inasmuch as the data is already available in the image memory. Additionally, the circuitry used to rewrite the image memory need not be of as high speed a design as in the earlier methods inasmuch as the image memory rewriting may be unrelated to the raster scan. The principle disadvantage to such a scheme is that substantial additional image memory is required. Although panning is possible, it is limited to the supplied image memory. Where it is desired to pan across a large portion of a image, the memory necessary to store the entire image is substantial. Accordingly, such a scheme is useful when only a limited panning is acceptable.

It is an objective of the herein disclosed invention to provide a panning apparatus for use in a raster scan video display system which does not require as high a speed of rewriting circuitry as prior art methods have required, yet which is useable for panning across an arbitrarily large image without requiring substantial additional image memory. It is a further objective of the herein disclosed invention to provide such a panning apparatus which is also able to provide a flicker free panning effect without degraded image quality. It is a further objective of this invention to provide a panning effect which is smooth and has operator specifiable direction and rate.

SUMMARY OF THE INVENTION

These and other objectives are achieved by providing a toroidal pan capability. Image memory having storage capacity slightly in excess of that required to contain data defining the image being displayed on the CRT is provided. The excess memory is used to store data defining an image border surrounding the area being displayed on the CRT. The image memory is accessable in a toroidal (i.e., donut shaped) manner so that the origin of the image being accessed by the raster scan apparatus may be located at any position in the image memory. The image memory is accessed toroidally in the sense that when an access for a memory address exceeds a coordinate boundary, the access is wrapped around to the opposite boundary of the coordinate axis, giving the effect of wrapping the image memory into a torus or donut. Means are provided to rewrite portions of the image memory so as to maintain a border of image information surrounding the image data being used for the current CRT display.

The image memory may be classified into three areas:

(1) The display or window area which contains data defining the image portion currently being displayed on the CRT.

(2) The pan or border area which contains image data defining the image portions which surround the display or window region. This border area may be immediately accessed by the raster scan apparatus as the display image is panned, since the image data necessary for the panning is available there.

(3) The rewrite area which is used by the rewrite means to enter and store data defining additional image portions as necessary to support the display image panning. As a display image is panned, the image memory is dynamically reclassified in synchronism with the panning operation, and rewritten as required.

A panning control means is provided to receive panning commands from the CRT operator and to create, in synchronism with the raster scan, a series of new image origin positions within the image memory, these origins being used by the raster scanning means to create the composite video signal necessary for the CRT. The image origin positions also are used by the rewrite means to update the image memory so as to preserve therein the desired border of image information surrounding the window being displayed.

BRIEF DESCRIPTION OF THE DRAWINGS

FIG. 1 is a diagrammatic representation of the organization of the image memory.

FIGS. 2A and 2B are diagrammatic representations of the toroidal aspect of the image memory, illustrating the display area, panning border area, and rewrite area before and after a toroidal pan operation.

FIG. 4 is an electrical block diagram of the panning controller illustrated in FIG. 3.

FIG. 5 is an electrical block diagram of the rewrite controller illustrated in FIG. 3.

FIG. 11 is an electrical block diagram of a strip erase and rewrite controller used in conjunction with the circuitry of FIGS. 9 and 10.

FIG. 12 is a pictorial illustration showing the regions of a master image that are rewritten into the image memory during panning.

DESCRIPTION OF THE PREFERRED EMBODIMENTS

Figure 3:
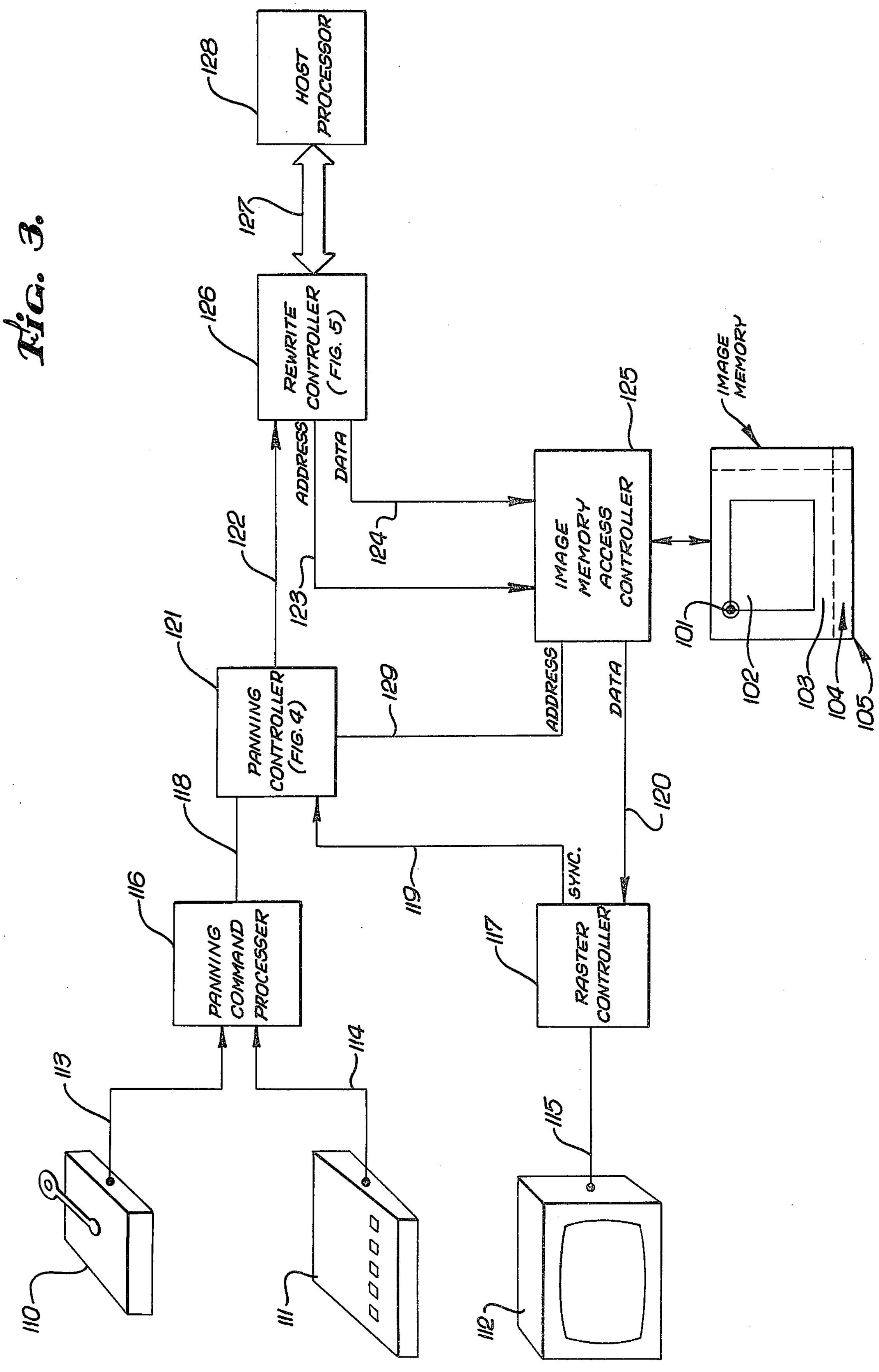
FIG. 3 is a electrical block diagram of one embodiment of the invention.

The following detailed description is of the best presently contemplated modes of carrying out the invention. This description is not meant to be taken in a limiting sense, but is made merely for the purpose of illustrating the general principles of the invention since the scope of the invention is best defined by the appended claims.

FIG. 1 is a diagrammatic representation of an image memory 105 used to store digitized data for a raster scan video graphics display system. As discussed below, the image memory 105 contains slightly more storage capacity than that required for storage data on the image being currently displayed. Although the image memory may be any of a variety of currently available random access memories, i.e., a core, semiconductor or magnetic bubble memory, and may have an addressing scheme unique to the actual memory device used, FIG. 1 assumes that via appropriate image memory access controller circuitry, the image memory 105 may be addressed in a two dimensional grid-like, orthogonal address coordinate manner. As illustrated in FIG. 1, the image memory may be characterized by certain parameters, i.e., it can be addressed in such a manner that it has P vertical columns of data and Q horizontal rows of data. With such an addressing organization, there are P times Q discrete addressable elements of picture information. It is assumed that the data defining each pixel, i.e., picture element, may be stored in a portion of a memory word, or several memory words. This is not critical to the invention since the amount of information stored for each image pixel does not affect the addressability of the image memory via appropriate image memory access controller circuitry in a specified coordinate based manner.

Within the image memory 105 there is illustrated a rectangular subset 102 of memory positions which corresponds to the display area which is being currently accessed in synchronism with the raster scan and used to form the CRT display. This display area 102 portion of the image memory 105 is essentially the digitized representation of the image which currently is being displayed on the display system CRT. As illustrated, we may denote the number of columns utilized in the image display area 102 as I, and the number of rows as L. The number of rows and columns in the display area 102 are directly related to the parameters of the raster scan. For instance, in one embodiment of the invention, the raster controller generates 312 horizontal raster scan lines, each such line displaying 416 pixels. Accordingly, for this embodiment, I would have the value 416 and L would have the value 312, so that the size of the display area 102 corresponds to the parameters of the raster scan. Of course, the invention herein disclosed should not be limited to specific parameters for the image memory since all possible such embodiments would come within the teachings of the invention.

Surrounding the display area 102 is a pan area 103. This pan area 103 adds J additional columns to each side of the display area 102 and M additional rows to the top and bottom of the display area 102. The pan area 103 of the image memory 102 contains data defining the image in the border adjacent to the image being displayed. When the display image origin 101 is moved within the image memory 105, the pan area 103 provides immediately available image data from which the CRT image can be generated.

Surrounding the pan area 103 is a rewrite area 104 including a vertical strip which adds 2K additional columns of image data, and a horizontal strip which adds 2N additional rows of image data. The rewrite area 104 is that area of the image memory 105 into which new graphic data is rewritten, in whole or part, as the display portion 102 is panned. Whereas the pan area 103 provides a border of image information which may be immediately accessed during panning to create the CRT display, the rewrite area 104 is that portion of the image memory 105 which is updated with new image data during such panning so that, when updated, it can serve as a new pan area 103. Obviously the locations of the areas 102, 103, 104 are not fixed in the memory 105, but will change as the CRT image is panned.

The actual portion of the rewrite area 104 which will have new image stored in it due to a pan operation is different for the two embodiments described below. In the embodiment of FIGS. 7A through 11, the entire vertical or horizontal strip is rewritten in a single strip erase and rewrite operation. In the embodiment of FIGS. 3 through 6, the rewriting is requested one column or one row at a time, with such rewriting occurring along certain rewrite limit lines 104-V and 104-H. These lines represent (in the embodiment of FIGS. 3–6) the pictorial "edge" of the image data surrounding the display area 102. As the display area 102 is panned in the image memory 105, it is the rewrite limit lines 104-V, 104-H which locate the portion of the rewrite area 104 which must be updated with new image data to maintain the desired border of image information.

The rewrite limit lines consists of a vertical line 104-V and horizontal line 104-H each having a specific relationship to the position of the display area. If the address in the image memory 105 of the origin or home position of the image being displayed on the CRT is designated as (X,Y) with the first value (i.e., "X") of the coordinate pair specifying the column in the image memory, then the vertical rewrite limit line 104-V consists of all pixels having image memory addresses with row value equal to $X'=(X+I+J+K) \bmod P$. The horizontal rewrite limit line 104-H consists of all pixels having image memory address with column values equal to $Y'=(Y+L+M+N) \bmod Q$. (In the embodiment of FIGS. 1 through 6, the y origin is at the "upper left" corner of the memory, and Y increases moving "down" the image.) In essence, the rewrite limit lines 104-V, 104-H are each positioned toroidally "half way across" the image memory 105 from the center of the display area 102 in the image memory 105, with the modulo P and modulo Q operations providing the toroidal addressing of the image memory.

If the display area 102 is panned a certain number of pixels horizontally and vertically, the rewrite border lines 104-H, 104-V advantageously are moved the corresponding number of pixels horizontally and vertically to maintain the pan area 103. So long as this rewrite operation proceeds at a pace sufficient to always have a border of image data in the image memory 105 surrounding the display area 102, the operator will be unaware of the fact that the image memory does not contain information as to the entire image which maybe panned across.

As FIG. 1 suggests, the pan area 103, although it contains data surrounding the display area 102, may be "wrapped" from one coordinate boundary edge to the opposite edge. Although not illustrated by FIG. 1, it is equally possible that the display area 102 or rewrite area 104 may also be toroidally wrapped in the image memory 105, depending on the position of the display image origin 101 in the image memory 105. Essentially, the coordinate addressing limits of the image memory 105 are extended in a toroidal, i.e., donut-shaped, manner so as to allow positioning of the display area 102-anywhere in the image memory 105 and for maintenance of the pan area 103 surrounding the display area 102.

As previously discussed, certain prior art panning systems provided additional image storage and panned directly across this additional storage. However, such methods required the panning to be limited by the actual size of the image memory. The herein disclosed invention uses a toroidal access and storage structure, allowing for continuous panning of an image without regard for the actual image memory addressing limitations.

As a illustrative example of the embodiment of FIG. 1, the pan area 103 may be sized to allow maintenance of M=10 additional rows of image data above and below the display area 102 and J=10 additional columns of image data on each side of the display area 102, with the rewrite area 104 having a total of 2K=2N=10 pixels width for the vertical and horizontal strips. In this embodiment, it can be calculated that the total image memory is: (1−((416+10+10+10)×(312+10+10+10))/(416×312))=19% more than the display area. This embodiment dramatically illustrates the minor increase, 19%, in size of the image memory which is sufficient, when coupled with the teachings of this invention, to allow panning of an image of arbitrarily large size.

Specifically, if a panning operation of X pixels is performed horizontally, the portion of the rewrite area 104 which will need to be updated with new image data is that portion between the vertical rewrite limit line 104-V and a parallel line displaced X positions in the rewrite area 104. If the panning operation is performed in an up and down direction, a similar horizontal strip in the rewrite area 104 will need updating. A panning operation having both vertical and horizontal directional components will naturally require updating of both the vertical and horizontal strips associated with the corresponding directional components.

It should be noted that although the pannning operation determines the portion of the rewrite area 104 which needs to be updated, the actual updating of the rewrite area 104 may be performed asychronously with respect to the actual panning operation so long as the pan area 103 is sufficient to provide the image data necessary for panning of the CRT image.

In the illustrative example just discussed, a satisfactory panning rate with adequate "safety area" around the display area has been obtained with J=M=10 and K=N=5. In such an embodiment, a pan area 103 containing data extending the display image by 10 pixels in all directions, coupled with a rewrite area 104 having horizontal and vertical strips totaling of 2K=2N=10 additional pixels, provide sufficient border information for typical panning of a 416×312 pixel display.

Although FIG. 1 illustrates the image memory organization as a rectangular coordinate system having specified rows and columns of picture information, the herein disclosed invention adds additional organizational structure to the image memory. Specifically, the image memory coordinate system is extended to a toroidal configuration in which continuation along one coordinate axis causes wraparound to the opposite side of the axis.

FIG. 2A and 2B better illustrate the toroidal or coordinate wraparound structure of the image memory 105 which is provided by the herein disclosed invention. Illustrated in FIG. 2A is the image origin 101 of the image being displayed on the CRT. Also illustrated is the display area 102 of the image memory. Surrounding the display 102 is the pan area 103. Also portrayed are the rewrite limit lines 104-V, 104-H in the rewrite zone 104.

FIG. 2B is a similar representation for the image memory with a new image origin 106 resulting from a CRT panning command. The original image origin 101 is illustrated also. The display area 102 of the image memory has been appropriately relocated to correspond to the new display origin 106. Also the pan area 103 and rewrite limit lines 104-V, 104-H have been appropriately moved. As the origin of the image memory being used for display moved from the position indicated in FIG. 2A to that indicated in FIG. 2B, the pan border 103 was accessed to provide to the CRT data for image pixels which were not previously being displayed. Along with the movement of the display origin, the rewrite area 104 was updated to maintain an appropriate border of information surrounding the image being displayed. After the updating, portions of the rewrite area 104 were reclassified as portions of the pan area 103 in accordance with the movement of the display area 102.

The rate at which panning is permitted is a function of several factors, including the dimensions of the pan area 103 and the rate of availability of image data for storage in it. In order to prevent the operator from being aware of the existance of a finite-sized border of image data in the image memory 105, it is desirable to limit the panning rate such that the pan area 103 may be dynamically maintained by the rewrite logic as panning is performed, or conversely, to insure the image update rate is consistant with the actual or maximum pan rate. The ability to access the image memory 105 in a toroidal manner allows continous panning to be performed, with only a small portion of the entire image which may be panned across actually being stored in the image memory 105 at any one time. Since additional image information may be accessed (e.g., from a host computer) by the rewrite circuitry as required, the operator is unaware of the fact that the image memory does not contain the entire image over which he may pan.

One advantage of the herein disclosed invention is that a minimum amount of image information is rewritten in the image memory 105 during a panning operation. The panning system is such as to allow the display image origin to be located anywhere in the image memory 105. The toroidal structure of the image memory 105 increases the flexibility of image storage in the image by eliminating the effect of coordinate boundaries.

FIG. 3 is a electrical block diagram of one embodiment of the herein disclosed invention which implements the toroidal image memory organization illustrated in FIGS. 1, 2A and 2B. The graphic information is displayed upon the CRT 112. The CRT operator via a joy stick 110 or keyboard 111 specifies either the direction of panning or the desired image origin destination which should be panned to. It is not necessary to provide the panning commands via a keyboard 111 or a joy stick 110; these are just representative methods for specifying the parameters of a panning command.

The joy stick 110 is connected to a pan command processor 116 via a signal bus 113. Similarly, the keyboard 111 is connected to the pan command processor 116 via a signal bus 114. The pan command processor 116 utilizes the commands received from the joy stick 110, the keyboard 111, or other pan command input means, to determines the direction and rate of the requested pan operation or the eventual image origin. This information is passed via a signal bus 118 to the panning controller 121.

The CRT 112 is connected via a cable 115 to a raster controller 117. The raster controller 117 generates synchronization signals on a bus 119 which specify the start of each raster frame, the start of each horizontal scan line, and when a pixel of image information is desired. The raster synchronization signals from bus 119 are processed by the panning controller 121. The raster synchronization signals, which specify the position on the CRT 112 for which image information is currently desired and the information obtained from the pan command processor 116 via the signal bus 118 permit the panning controller 121 to determine (using appropriate toroidal conversion) the display image origin 101 and the appropriate image memory 105 addresses which contain the pixel information to be displayed in accordance with the raster scan of CRT 112.

In synchronism with the raster sync signals provided on the signal bus 119, the panning controller 121 requests image data from an image memory access controller 125 via an address bus 129. The image memory access controller 125 processes the memory access request from the panning controller 121, and reformats the request in the hardware addressing scheme necessary for the actual memory hardware utilized in the image memory 105. The requested data is provided via a signal bus 120 to the raster controller 117. The raster controller 117 uses the data provided on the signal bus 120 to format a composite video signal for the CRT 112.

Via a signal bus 122, the panning controller 121 provides the display image origin address and the panning movement information to the rewrite controller 126. The rewrite controller 126 uses this information to determine the necessity of updating the image memory pan border 103. If the pan area 103 of the image memory 105 should require updating due to a panning request, a remote host processor 128 is accessed via a signal bus 127. It is assumed that the host processor 128 contains or can generate the entire image which may be displayed or panned across. For example, the host processor may contain a large amount of direct access mass memory containing digitized image information. Via the bus 127, the rewrite controller 126 may retrieve any portion of the image which is being partially displayed, and store the information in the image memory 105, thereby maintaining the desired relationship between the display area 102 and the pan border 103. The image information received from the host processor 128 is processed by the rewrite controller 126 and presented to the image memory access controller 125 via a memory address bus 123 and a data bus 124.

FIG. 4 is a more detailed electrical block diagram of an embodiment of the panning controller 121 illustrated in FIG. 3. As previously discussed, the panning controller 121 is connected to the pan command processor 116 via a signal bus 118. This signal bus 118 contains two signal buses 130, 131. The signal bus 131 provides the column coordinate value for the desired image origin to a compare circuit 164. In this embodiment the signal bus 118 from the pan command processor 116 specifies the desired image display origin, rather than specifing a panning direction. Of course, a panning direction may be indicated via a series of desired display image origins.

The signal bus 118 also contains the signal bus 130 which provides the row value of the coordinate address for the desired image origin to a compare circuit 155. The synchronization signal line 119 from the raster controller 117 contains the three indicated signal lines: a horizontal synchronization signal line 138, a vertical synchronization signal line 133, and a frame synchronization signal line 132. The frame sychronization signal line 132 specifies the beginning of a raster scan frame. The vertical synchronization signal line 133 specified when the raster scan initiates the scanning of a new horizontal line. The horizontal synchronization signal line 138 is pulsed as information for each pixel is required by the raster controller 117 so that it may continue to format a CRT raster scan line.

A register 134 contains the column coordinate value of the image origin address for the previous raster frame. The compare circuit 164 compares the value stored in this register 134 with the column coordinate value for the desired origin address as received on the signal line 131. The comparator 164 determines the absolute value of the difference in the two column coordinate values and outputs it on a signal bus 142. In addition it supplies a signal on a line 141 indicative of whether the column coordinate value of the origin is moving to the left or right. The difference value outputted on the signal bus 142 is passed to a minimum value selector 143 which compares the value received on signal line 142 with the maximum permissible horizontal (column) change between consecutive raster frames, as stored in a register 144. The minimum value selector 143 is used in this embodiment to limit the maximum horizontal panning from one raster frame to another so as to insure that the rewrite controller 126 may update the rewrite area 104 at a rate sufficient to maintain the pan area 103 in the image memory 105.

The left or right signal on the line 141 from the comparator 164 is passed to an adder/subtracter 165, which determines whether the output of the minimum value selector 146 should be added to or subtracted from the value contained in the previous display origin column address register 134. The result of this addition or subtraction is passed via a signal bus 139 to a register 136 containing the column coordinate value of the display image origin for the next raster frame. The value contained in this register 136 is passed via a signal bus 135 to a modulo P counter 137, and to the register 134 containing the column coordinate value for the display image origin from the previous raster frame. The register 134 accepts the contents of the register 136 upon an a pulsing of the frame synchronization signal line 132, causes the register 134 to latch, i.e. input and store, the contents of register 136. In addition, the frame synchronization signal line 132 connects to the modulo P counter 137, and when pulsed, causes the modulo P counter 137 to be preset (modulo P) to the value of the contents of register 136, i.e. the column coordinate value for the display image origin to be used for the next raster frame.

The modulo P counter 137, an element in a toroidal addressing formatter 250, is used to provide the toroidal wraparound addressing structure to the image memory coordinate system. As previously mentioned, the image memory 105 is assumed to be addressable in a rectangular coordinate system having Q rows and P columns. This counter 137 is preset (modulo P) by the frame synchronization signal line 132 to the column coordinate value for the next raster frame display image origin in the image memory 105. With each horizontal synchronization signal pulse on the line 138, this counter 137 is incremented, thereby updating the desired column coordinate value to be accessed from the image memory access controller 125. Since the counter 137 is a modulo P counter, once it reaches the value of P, i.e., the number of columns in the image memory 105, the counter cycles back to zero, thereby providing the wraparound feature in the horizontal (column) direction. The output of this modulo P counter 137 is presented via a signal bus 147 as part of the signal bus 129 to the image memory access controller 125 and constitutes the horizontal raster readout address.

Circuitry similar to that discussed for the column coordinate wraparound is provided for the row wraparound feature of the panning controller 121. Specifically, the signal bus 118 from the pan command processor 116 to the panning controller 121 specifies via a signal bus 130 the row value of the coordinate for the origin of the display image which is desired to be panned to. This signal bus 130 terminates in a compare circuit 155. The comparator 155 compares the desired row coordinate value with the value stored in a register 153, containing the row value for the display image origin used in the previous raster frame. The absolute value of the difference of these row values is made available on a signal bus 157 to the minimum value selector 158. Additionally, the comparator 155 specifies on a signal line 156 whether the value received on the signal line 130 or the value stored in the register 153 is larger, i.e., it determines whether the display origin is moving down or up respectively. The signal on the line 156 is used to select the operation to be performed in an adder/subtracter circuit 161.

The minimum value selector 158 compares the absolute value difference outputted from the comparator 155 on a signal bus 157 with the register value stored in a register 160. The register 160 contains a maximum allowable change in row origin coordinates between consecutive raster frames, restricting the vertical panning rate to the specified value. This is one possible embodiment for limiting the panning rate so as to ensure that the pan area 103 always contains image data delivery the image surrounding the display area 102. This register 160 transfers its value to the minimum value selector via a signal bus 159. The output of the minimum value selector 158 is obtained from a signal bus 163. This value is fed into the adder/subtracter 161 which computes and makes available on a signal bus 162 the column value to be used for the coordinates of the display image origin in the image memory 105 for the next raster frame. This value is stored in a register 152. The output of the minimum value selector 158, on the signal bus 163, is also made available to the rewrite controller 126 via a signal bus 122.

The value in the register 152 is used to preset (modulo Q) a modulo Q counter 150 when the raster scan frame synchronization signal 132 indicates that the modulo Q counter 150 should be so preset at the start of a new raster frame. This counter 150 is modulo Q since there are assumed to be Q rows available in the image memory 105. The counter 150 is incremented by the vertical synchronization signal line 133 whenever the raster controller so indicates that the next raster line is to be formatted. Since the counter is modulo Q, when it exceeds the value Q, it returns to the value zero, thereby providing the toroidal wraparound addressing feature in the row direction of the herein described invention.

The output of the counter 150, the vertical row component of the raster readout image memory address, is available on a signal line 148 and supplied via the signal bus 129 to the image memory access controller 125. As mentioned earlier, the signal bus 129 also contains the horizontal (column) coordinate value for the pixel to be addressed. Therefore, provided on the signal bus 129 are image memory 105 addresses which, in accordance with the raster scan synchronization signals on the signal bus 119, access the image memory 105 in a toroidal manner via the image memory controller 125. Since these column and row addresses on the busses 147, 148 are synchronized to the video scanning clock, the toroidal addressing formatter 250 directly provides image memory addresses for raster scanning in a toroidal manner.

Additionally, the signal bus 122 to the rewrite controller 126 contains the row coordinate value for the previous raster frame display image origin on a signal bus 154, the column coordinate value for the previous raster frame's display image origin on a signal bus 140, the column coordinate value change in display origin on a signal bus 146, and the change in the row coordinate value for the display image origin on a signal bus 163. Via these signal busses, incorporated into the signal bus 122, the rewrite controller 126 has available the address in the image memory for the display image used in the previous raster scan frame, and in addition it has available the change in the display image origin from the previous raster scan frame to the next display image origin. This information is sufficient for the rewrite controller 126 to determine the rewrite area 104 in the image memory 105 which must be rewritten to maintain the desired pan area 103.

If the desired display image origin address received via the signal bus 118 is too far to pan to in one raster frame, the panning controller 121 generates a series of display image origin addresses, one per raster frame. The effect of this is to create a smoothly panning image on the CRT 112 at the maximum rate permitted by the panning controller.

An electrical block diagram of one embodiment of the rewrite controller 126 is illustrated in FIG. 5. In addition to the signal busses 140, 141, 146, 154, 156 and 163 received from the panning controller 121, the rewrite controller 126 also receives a series of clocking pulses from a rewrite clock generator 270 via a signal line 170. In this embodiment, the rewrite clock generator 270 should have a clock rate at least sufficient to generate sufficient pulses to update the maximum number of columns and rows of panning allowed between consecutive raster frames. These maximums are specified in the registers 144 and 160 respectively. The column coordinate value for the previous raster frame's display image origin, received on the signal bus 140 is processed by an adder 178. This adder 178 adds to the value received on the signal line 140 a rewrite column offset constant as stored in a register 176. This register 176 contains the appropriate number, (I+J+K), to specify the offset required from the column value of a display origin address within the image memory to the column coordinate value for the vertical line 104-V of the rewrite border 104. The sum from the adder 178, i.e. the column coordinate address of the vertical line of the rewrite border, is forwarded via a signal line 179 to a modulo P counter 260.

As previously discussed, the rewrite controller 126 will have to update a column of image data in the rewrite area 104 for each column panned, and a row of image data for each row panned. The embodiment of the rewrite controller illustrated in FIG. 5 uses the clock pulses from a rewrite clock generator 270 to first update the columns, then to update the rows of the rewrite area 104. However, alternative embodiments of the rewrite controller 126 could readily update rows before columns, or update both rows and columns simultaneously without departing from the spirit and scope of the teachings of the invention.

Rewrite clock signal line 170 is attached to two AND-gates 171, 172. The AND-gate 171 also has an input signal from a signal line 261 which is high whenever the contents of a counter 262 are nonzero. The signal line 261 is the output of an inverter 263, which inverts signal line 173. The signal line 173 is high whenever the counter 262 has a zero value. The counter 262 contains a zero value only after the appropriate columns of the rewrite area 103 have been updated. Essentially, the signal line 173 specifies whether the row or column portion of the panning area 103 is being rewritten. If the column portion of the panning area 103 is being updated, the signal line 173 will be low, enabling the rewrite clock signal line 170 be coupled to the column clock signal line 174, via the AND gate 171. Alternatively, if the signal line 173 is high, indicating that the counter 262 has reached a zero value, the AND gate 172 enables the clock signal line 170 to be coupled to the row clock signal line 175.

The signal bus 146, containing the change in column coordinate values for the origin between the current raster scan and the previous raster scan frame, is used to preset a counter 262. Each clock pulse on the column clock signal line 174 causes the contents of the counter 262 to be decremented. Additionally, the column clock signal line 174 causes the contents of modulo P counter 260 to be incremented or decremented depending on whether a signal line 141, specifying the direction of change in column values of the display image origin, is high or low. This counter 260 provides the toroidal wraparound column addressing by insuring that the column coordinate value is in the proper addressing range for the image memory access controller 125. The results of this counter 260 are passed via a signal line 181 to a column row request formatter 186. This formatter 186, having received the column coordinate value for a column which must be updated to maintain the desired pan border in the image memory, generates the requisite signals, code, or instruction set utilized by the specific host processor 128 to access the needed image data, and forwards the results via a signal bus 187 to a host interface module 206. The formatter 186 keeps track of the position in the host processor master image from which data is to be obtained for the column being updated. For this purpose, the formatter 186 also receives the pan direction signal from the line 141 and data via a line 188 from the row request formatter 204 specifying the master image vertical position from which row data is to be accessed. The host interface module 206 reformats the request as necessary in order to interface via a signal bus 127 with the host processor 128 which provides or generates the complete image information.

As previously discussed, the counter 262 continues to be decremented by the column clock signal line 174 pulses until the result is zero, thereby inhibiting, via the signal line 173, of the column clock signal pulses on the line 174. When this has occurred, the columns of the rewrite area 210 which must be updated to maintain the desired border of panning information on either side of the image display currently being accessed by the raster scan have had appropriate requests formatted for the host processor 128. At this point, the row clock signal line 175 is enabled due to the effect of the signal line 173 upon the AND gate 172.

It should be observed that the host processor 128 need not provide the requested column of image data in synchronism with the requests. The host interface module 206 may maintain in an internal memory a list of image requests for which the host processor 128 has not yet provided image data, together with a list of the corresponding rows and columns to be rewritten in the image memory 105. When the requested data is eventually provided to the host interface module 206, it may be stored in the image memory 105 even though additional data requests have been made in the meantime. The host interface module 206 will coordinate the image data received from the host processor 128 with the corresponding area on the image memory 105 which must be updated.

Circuitry similar to that used for updating the columns of panning area is provided for the updating the panning area 103 above and below the display area 102. Specifically, a counter 264 is initialized via the signal bus 163 to contain the change in the vertical direction (i.e., change in row coordinate values) between the previous raster frame's display image origin and the current raster frame's display image origin. An adder 196 adds the row value of the coordinate for the previous raster frame display image origin address, as obtained from the signal bus 154, to the contents of a rewrite row offset register 194 and stores the result via a signal line 197 in a modulo Q counter 265. The register 194 contains a constant value, (L+M+N), specifying the row offset from the row coordinate value of the previous display image origin to obtain the row coordinate value for the horizontal row forming the rewrite border 104.

Each clock pulse received on the row clock signal line 175 causes the counter 264 to be decremented. Additionally, clock pulses on the row clock signal line 175 cause the modulo Q counter 265 to be incremented or decremented, depending on the direction of change in display image origin values as specified by the signal line 156. When a zero result is obtained in the counter 264, the panning area 103 has been completely updated in both the horizontal and vertical directions. The modulo Q counter 265 peforms the toroidal wraparound row addressing by insuring that the row coordinate values forwarded to the row request formatter 204 via the signal bus 198 are in the proper addressing range for the image memory. The row request formatter 204, having obtained the row coordinate value for the desired row in the rewrite area 210 to be updated in the image memory 105, forwards an appropriately formatted request via a signal bus 205 to the host interface module 206. The host interface module 206 reformats the request for additional image information into the form required by the host processor 128 and forwards the request via the signal bus 127 to the host processor 128.

In addition to its function of requesting data from the host processor 128, the host interface module 206 also reformats the image data (received from the host processor 128 as earlier requested by the column 186 or row 204 request formatters via the signal bus 127) into an image memory address and corresponding image data which is suitably formatted for processing by the image memory access controller 125. The image memory address is provided to the bus 123 and the corresponding new image data necessary to maintain the desired panning border is provided to the bus 124.

Other methods for governing the panning rate with respect to the rate at which additional image information may be retrieved from the host processor may be implemented without departing from the spirit of the invention. For instance, rather than fixing a maximum horizontal and vertical display image origin change permissible between raster frames, it will be obvious to one skilled in the art that a more complex algorithm, taking into account the dynamic availability of image data from the host processor and the actual border still remaining around the display area may be implemented.

Figure 6:
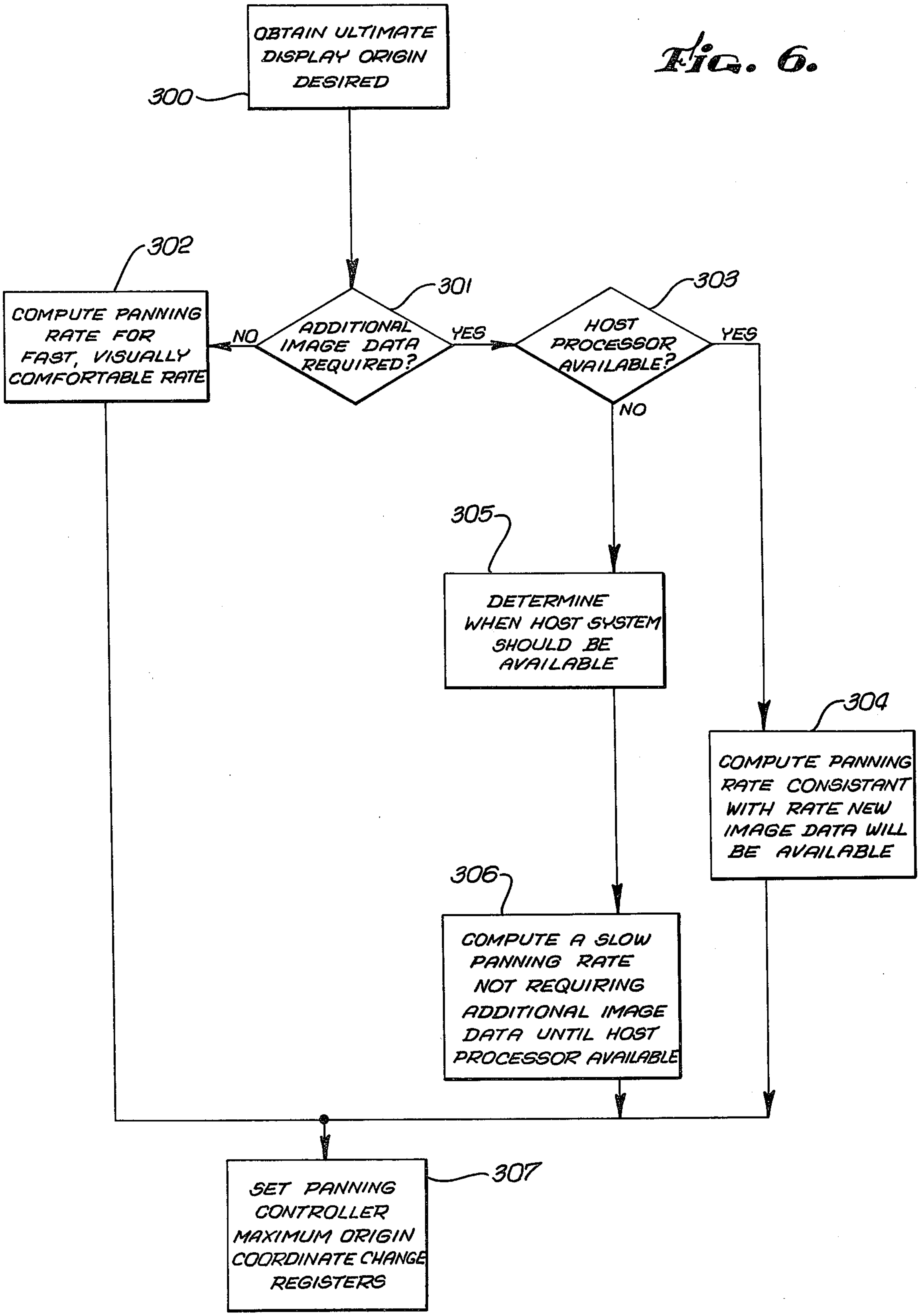
FIG. 6 is a flowchart diagram summarizing an alternative embodiment of a method for determining a pan rate.

FIG. 6 summarizes an alternative embodiment for determining the maximum horizontal and vertical display image origin changes permissible between raster frames. It should be noted that a rate at which panning occurs is essentially determined by a series of display image origin addresses, one for each raster frame. As has been mentioned, the embodiment of the panning controller 121 illustrated in FIG. 4 implemented a relatively simple and uncomplicated method to assure that while a panning operation was being performed, the necessary image data used for each raster frame would be available in the image memory. This was done by providing in the register 144 a maximum permissible change in column coordinate values between the display origin coordinate addresses used by consecutive raster frames. Stored in the register 160 was the corresponding maximum permissible change in display origin row coordinate values between consecutive raster frames. Essentially, these registers limited the horizontal and vertical components of the panning rate to a value which was consistent with the availability and response rate from the host processor 128.

Such a method for limiting the panning rate makes certain assumptions about the host processor 128. For instance, implicit in such a scheme is the assumption that the host processor has a uniform or highly predictible response time for providing or generating requested image data. Such a panning rate limitation may be unduly restrictive in that where the panning area 103 contains all the necessary image data which will be required for the entire panning operation requested, there is no reason to limit the panning rate due to limitations in the host processor 128. In other words, a panning operation moving the display origin only a short distance could be performed at a panning rate determined by the desirable visual effect of panning upon the person viewing the CRT display 112. So long as the display area 102 and panning area 103 contain sufficient image data to completely perform the desired panning operation without accessing the host processor 128 for additional image data, the panning rate could be determined primarily from a consideration as to what is the maximum panning rate which gives the desired display effect.

FIG. 6 generally illustrates a less restrictive method for determining the panning rate, which takes into account additional information than that used in the embodiment illustrated in FIG. 4. Initially (processing step 300) the desired ultimate panning display origin is received. Alternatively, if the operator requests a specific panning rate and pannning direction, such a request can be decomposed into a series of desired display origin addresses, the series corresponding to the specified direction and panning rate. Once the desired ultimate display origin address is determined, the next step (decision box 301) is to determine whether the display area 102 and panning area 103 in the image memory 105 contain sufficient image data to completely perform a pan operation to the desired display origin address. If the host processor 128 is one which does not respond immediately or responds in an unpredictible rate to request for image data updates, it is possible that the pan area 103 may not contain all the image data which had been requested by earlier pan operations. However, this can be taken into account when determining whether additional image data is required to perform the current pan operation. In this regard, in the embodiments of FIGS. 3 through 6, the boundaries in FIG. 1 between the pan area 103 and the rewrite area 104 are artificial. All parts of the zones 103 and 104 are immediately available for panning except the specific portions of the rewrite area (e.g., those adjacent to the lines 104-V and 104-H) which are currently being updated.

If no additional image data will be required to perform the panning operation, then, as indicated in process block 302, a panning rate can be computed which gives a fast, yet visually pleasing pan effect on the CRT screen. It is quite possible that the panning rate could be so high as to cause the CRT operator to see the panning operation performed as a series of discrete image jumps for each raster frame, an effect which is not usually desirable since a smoother, i.e., slower, panning rate would not be so disconcerting to the CRT operator.

On the other hand, if additional image data is required to complete the panning operation requested, then, (decision block 303), a determination is made as to whether the host processor is available for additional requests for image data. Since the present invention is not limited to use with a particular host processor, the decision to be made at this point is a function of the particular host processor which is to be used. For instance, the host processor may have a highly predictible rate for responding to an image data request. Conversely, the rate at which the host processor 128 will respond to a given image request may be highly unpredictible due to the nature of the request, other processing functions being performed by the host processor, other requests made upon the host processor which are of higher priority than that of image data requests, and a multitude of other factors. Additionally, the host processor may batch together multiple image data requests so as to more efficiently generate or access the desired image data.

If the host processor is available for additional image data requests, then, as indicated in the process box 304, a panning rate is computed which is consistent with the rate at which the host processor 128 will be able to provide image data. It should be remembered that the host processor need not supply image data in strict synchronism with the request. This is unnecessary since the panning area 103 provides a safety margin of image data which may be profitably "spent" during the course of the panning operation, thereby allowing the panning operation to be performed smoothly up to the highest average rate that the host processor 128 will be able to provide image data. This point is very significant as many types of current host processors can far more readily provide ten rewrite lines in a batch after a 170 msec wait (10 frame times) than one rewrite line every 17 msec. One reason for this is that getting the picture data may require access to disc memory that can transfer data very rapidly but only after a very long latency. In raster form ten rewrite lines with three bits per pixel might require 15,000 bits of data. Typical discs could transfer this amount of data in 2 msec after an inital latency of perhaps 100 msec.

If the host processor is currently unavailable for processing additional image requests a determination is made (process box 305) as to when the host system should be available for such processing. Then, as indicated in process box 306, a panning rate is computed which is sufficiently slow so that additional image data will not be required until the host processor 128 is able to provide such additional data. Of course, if it cannot be determined exactly when the host processor 128 will be able to provide such additional image data, then even if a slow panning rate is initiated, it may be necessary to halt the panning operation to allow the host processor to "catch up".

After the optimun panning rate has been determined, the panning controller 121 is set (processing box 307) to limit the panning rate to the determined rate. In the embodiment illustrated in FIG. 4, registers 144 and 160 may be appropriately set to cause the panning rate to not exceed the desired rate. Although the embodiments described herein have been defined in terms of hard wired digital logic, it is readily apparent that a suitable combination of hardware and software may provide results in accordance with the present invention.

FIGS. 7A through 11 illustrate an alternative embodiment of the inventive toroidal panning system. In this embodiment, the image memory 15 (corresponding generally to the image memory 105 of FIGS. 1 through 6) is erased and rewritten in "rectangular" strips of width $W_s$. Erasure and rewriting of each strip is initiated by the panning controller circuitry 16A and 16B of FIGS. 9 and 10 in response to a reduction in the size of the remaining memory image border in the direction of panning. When this remaining border height or width is reduced to a certain value (typically equal to the strip width $W_s$), the circuitry 16A, 16B causes a strip erase and rewrite controller 17 (FIG. 11) to enter new data into the appropriate memory strip. By duplicating the circuitry of FIGS. 9, 10 and 11 for each axis, combined vertical and horizontal toroidal panning is implemented with appropriate strip by strip rewriting of the image memory.

The conditions under which strip rewriting takes place are illustrated in FIGS. 7A through 8E. For ease of explanation, FIGS. 7A–7D illustrate panning in only the vertical direction. In this example, the image memory 15 is $H_m=96$ rows high and $W_m=112$ columns wide. The CRT display is generated from a "window" or display portion 18 of the memory 15 having a height $H_d=48$ and a width $W_d=64$. Of course, these values are used only to simplify the description. In an actual raster display image memory, the "window" typically may be 312 rows high by 416 columns wide, and the total memory 15 size may be e.g., 360×464.

Figure 7A:
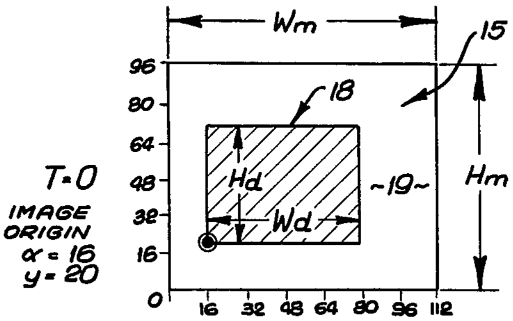
FIGS. 7A–7D and 8A–8E pictorially illustrate the toroidal organization of the image memory during panning in a single axis and in two axes, respectively, and further illustrate the erasure and rewriting of strips within the image memory under control of the circuitry shown in FIGS. 9 through 11.
Figure 7B:
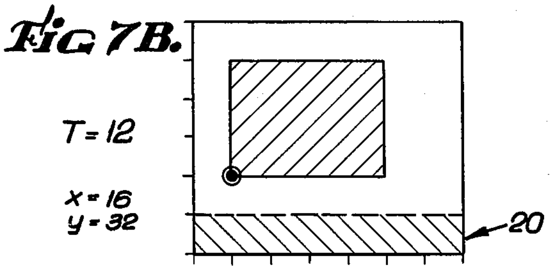

In the example of FIG. 7A, at the initial time T=0 the origin of the window 18 is at x=16, y=20. The illustrated panning rate is one row (i.e., +y) per CRT frame, in the upward direction. The memory 15 has a border 19 of data surrounding the window 18. In the +y direction of panning, the width $W_b$ of this border 19 "above" the window 18 at T=0 is (96−68)=28 rows of data. The width of the border 19 region "below" the window 18, opposite the direction of panning, is 20 rows. In this illustrative example, $H_m=H_d+3W_s$ and $W_m=W_d+3W_s$ and both $H_d$ and $W_d$ are multiples of $W_s$.

In the example of FIGS. 7A–7D, the erasure and rewriting of a memory strip 20 occurs when the width $W_b$ of contiguous image data in the border 19 in the direction of panning (including data available by toroidal wraparound) is less than 16 rows. With the +y per frame panning rate illustrated, this condition occurs at time T=12, where each unit of time T corresponds to one CRT frame. This condition (shown in FIG. 7B) is recognized by the panning controller circuitry 16B (FIG. 10), which causes the controller 17 (FIG. 11) to erase and rewrite new data into the strip 20 designated by the hatching in FIG. 7B. The height of this strip 20 is $W_s=16$ rows. It is rewritten with image data which is contiguous to the image portion present at the top edge of the memory 15, and is available for use as the window continues "upward" panning with toroidal wraparound to the "bottom" of the memory 15. Note that there remains a portion of the border 19, directly "below" the window 18, having a width of 16 rows and containing unmodified image data. This region is available for use immediately, in the event that the panning direction should be reversed.

Figure 7C:
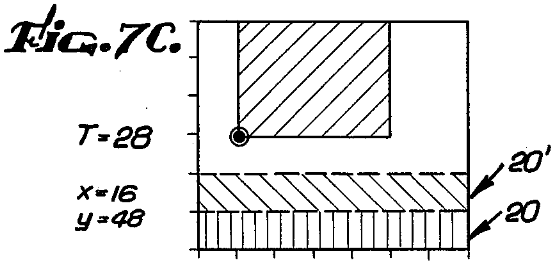
Figure 7D:
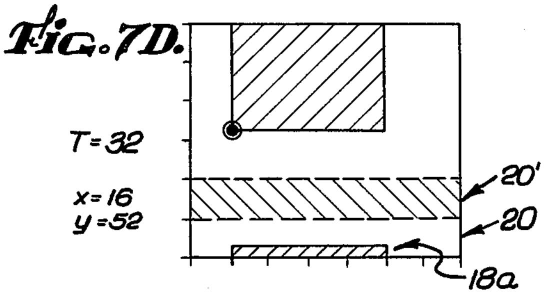

In the embodiment of FIGS. 7A–7D, each rewritten memory strip of width $W_s=16$ is rewritten within 16 frame times. Thus at time T=28 (FIG. 7C), the strip 20 will have been completely rewritten with data representing the portion of the image contiguous with the upper edge of the memory 15. Thus the strip 20 now is available for use as part of the window 18 when that window is panned toroidally upward past the upper (y=96) border of the memory 15. This is illustrated in FIG. 7D at time T=32. Data for the upper portion 18*a* of the window 18 now is accessed from the strip 20 which had been erased at time T=12 and rewritten during the interval T=12 through T=28.

Further panning in the +y direction is enabled by rewriting of the next adjacent strip 20′ the erasure of which occurred at time T=28 (FIG. 7C). At that time, the available border width in the direction of panning was equal to 16 rows. That condition initiated the rewriting of the strip 20′ with such rewriting being completed at time T=(28+16)=44.

FIGS. 7A through 7D illustrate toroidal addressing of the memory 15 both for entry of new data into the strips 20, 20′ etc., and for accessing of the window 18 to create the CRT display. For example, at T=32 (FIG. 7D), the origin of the window 18 is x=16, y=52. The address of the upper, left hand "corner" of the window 18 thus is obtained by adding to the origin y-axis value (y=52) the height $H_d=48$ of the window 18, this addition being modulo 96 (i.e., modulo the height $H_m=96$ of the image memory 15) yielding an upper edge coordinate of (52+48=100)−96=4. In other words, the top edge of the window portion 18*a* is at y=4. Similar toroidal addressing is used with respect to entry into the image memory 15 of the new data for the strips 20 and 20′.

Two-dimensional toroidal panning and strip rewriting of the image memory 15 is illustrated in FIGS. 8A through 8E. The dimensions of the memory 15 and the window 18′ are the same as those for FIGS. 7A–7D. Now, however, the horizontal panning rate is +2x (i.e. two columns) per CRT frame and the vertical rate is +y (i.e. one row) per frame. In this illustration, a strip of width $W_s$ is rewritten within 8 frame times. At the initial time T=0 (FIG. 8A), the window origin is x=20, y=20.

At time T=6 (FIG. 8B), the width of the border 19 to the right of the window 18' in the horizontal panning direction is 16 columns wide. At this time, a panning controller like that of FIG. 10 initiates the erasure and rewriting of a vertical strip 20A having a width $W_s=16$ columns. This strip 20A is separated from the left edge of the window 18' by an unchanged portion of the border 19 also having a width of 16 columns. This portion is available for immediate access in the event that the direction of horizontal panning is reversed.

At time T=12 (FIG. 8C), the window 18' reaches an origin height of y=32, so that the available border 19 above the window 18' in the direction of vertical panning is now 16 rows. At this time (as in the example of FIG. 7B), the panning controller circuitry 16B initiates the erasure and rewriting of a horizontal strip 20B of width $W_s=16$ rows.

Figure 8A:
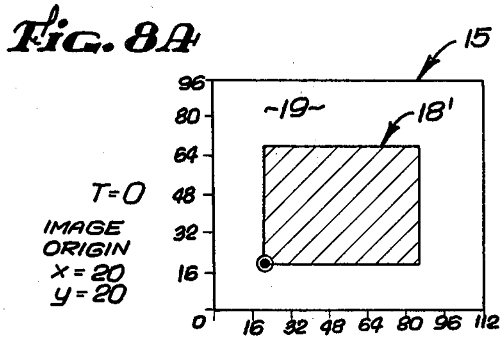
Figure 8B:
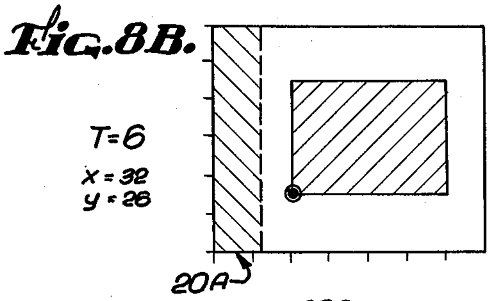
Figure 8C:
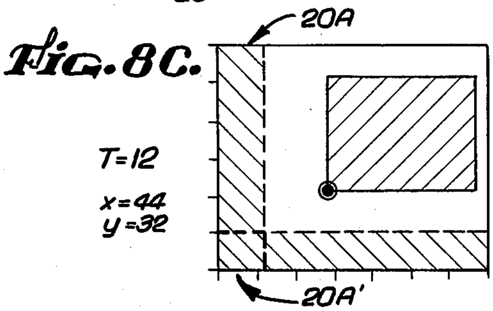

As seen in FIG. 8C, the horizontal strip 20B overlaps a portion 20A' of the vertical strip 20A which is currently being rewritten. This condition is sensed via interconnections between the panning controllers for the respective vertical and horizontal axes, and an appropriate priority scheme is implemented. It is preferable to have the most recent erasure and rewrite command take precedence over a rewrite operation which had begun earlier. Thus in the example of FIG. 8C, the newly initiated erasure and rewriting of the horizontal strip 20B would predominate over the earlier initiated rewriting of the vertical strip 20A. In that instance, at time T=12 the erasure of strip 20B would also erase the area 20A', and thereafter the region 20A' would be considered as part of the region 20B for rewriting purposes, with the region 20A' being excluded from the continued rewriting of the vertical strip 20A.

Figure 8D:
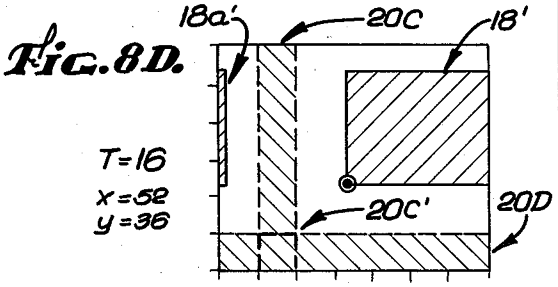

Toroidal addressing in the vertical axis is illustrated in FIG. 8D, where at the time T=16 the image 18' has wrapped around the memory 15 and includes an area 18a' extending inward from "left" border of the memory 15. The horizontal coordinate of the right hand edge of this window section 18a' is obtained by modulo $W_m=112$ addition. Thus at time T=16, the horizontal origin position of the window 18' is x=52, so that the right hand edge of the strip 18a' is given by $x=(52+64=116)-112=4$. Similar toroidal addressing is used for data entry into the vertical strip 20A and the adjacent vertical strip 20C the erasure and rewriting of which began at T=14 and is in progress at T=16. At this time T=16 the strip 20B is still in the process of being rewritten, and the overlap region 20C' is excluded from the strip 20B but included in the later begun rewriting of the vertical strip 20C.

Figure 8E:
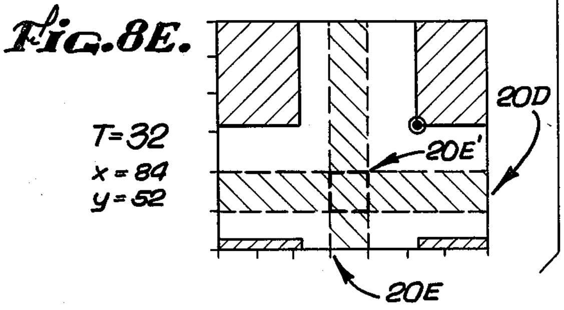

Complete toroidal or modulo addressing of the memory 15 in both the vertical and horizontal axes is illustrated in FIG. 8E for time T=32. The origin of the window 18' is now at x=84, y=52. The coordinates of the diagonally opposite corner of the window 18' are found by modulo addition as $x=(84+64=148)-112=36$, and $y=(52+48=100)-96=4$. At the time T=32 a horizontal strip 20D and a vertical strip 20E both are being rewritten. Rewriting of the strip 20E began later in time (at T=30) so that it dominates in the overlap region 20E'.

Figure 9:
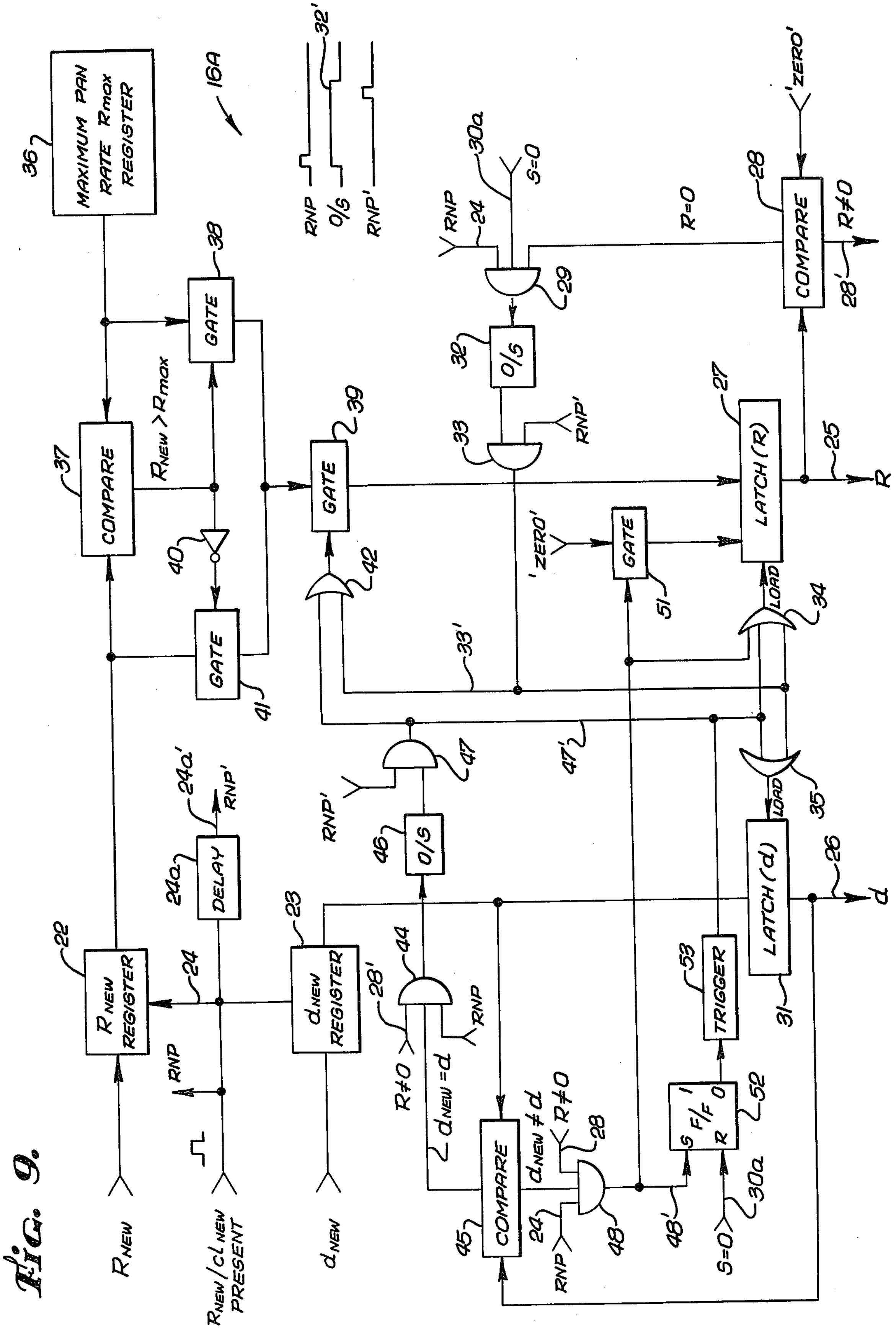
FIGS. 9 and 10 together constitute an electrical block diagram of another embodiment of a toroidal panning controller in accordance with the present invention.
Figure 10:
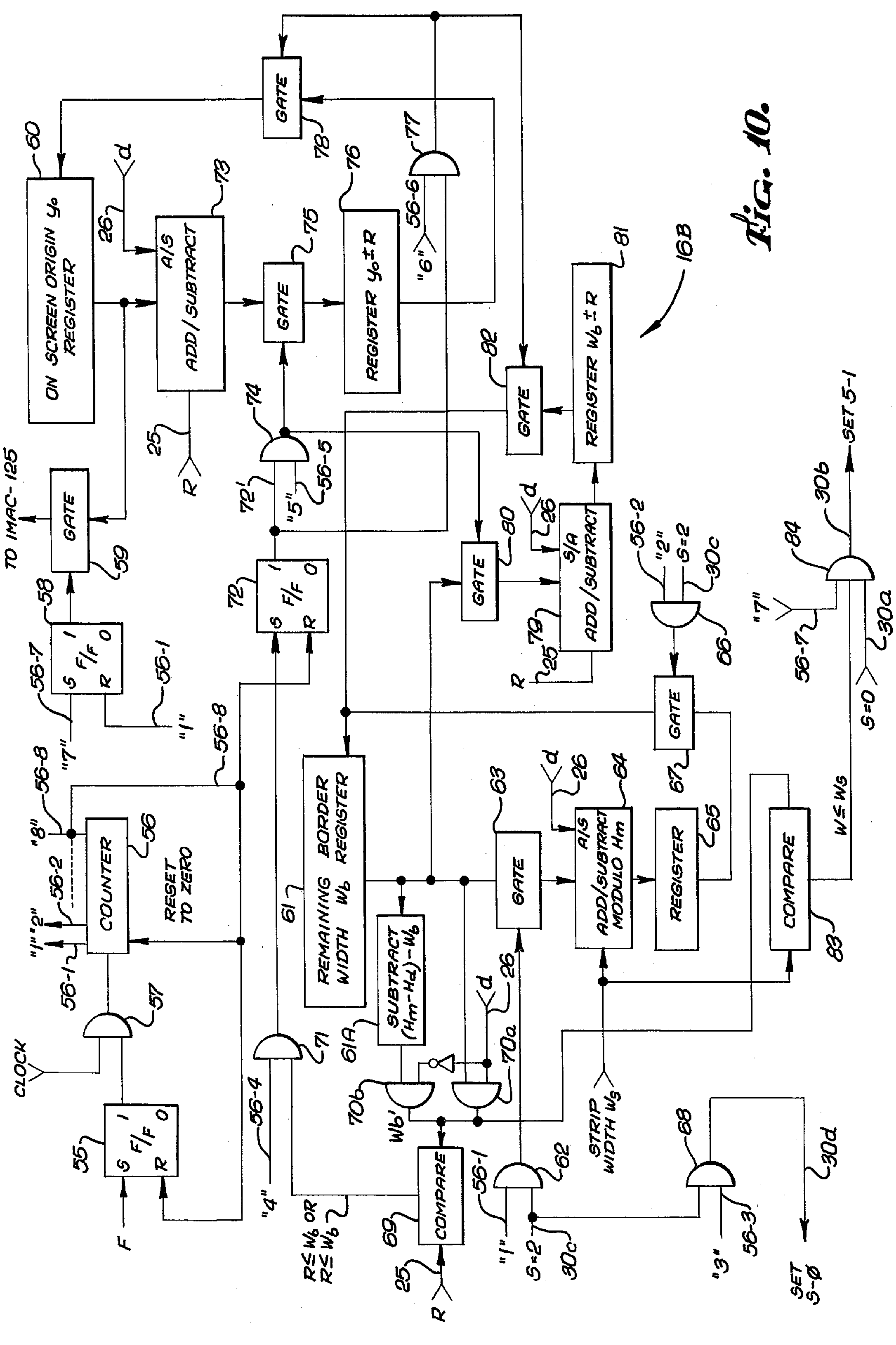

The panning controller 16A, 16B of FIGS. 9 and 10 and the strip erase and rewrite controller 17 of FIG. 11 are used to implement the vertical toroidal panning illustrated in FIG. 7A-7D. Advantageously, a duplicate set of such controllers is used for the horizontal axis so as to implement the two-axis toroidal panning of FIGS. 8A-8E. Appropriate interconnections are used to control rewriting priority in the strip overlap areas 20A', 20C' etc.

Referring to FIG. 9, the panning controller circuitry 16A advantageously receives as inputs a first digital signal $R_{new}$ representing a new panning rate, and a second digital signal $d_{new}$ representing a new panning direction. These signals may be provided from a pan command processor analogous to that designated 116 in FIG. 3. The values $R_{new}$ and $d_{new}$ are loaded into the respective registers 22 and 23 upon occurrence of a "new rate or direction present" pulse RNP that is concurrently provided on a line 24.

The circuitry 16A makes certain determinations, the first being whether or not a panning or strip writing operation currently is in progress. If neither of these are going on, the circuitry 16A immediately initiates a panning operation by providing a new panning rate signal R and direction signal d on the respective lines 25 and 26. As described below, the circuitry 16B (FIG. 10) utilizes the rate and direction signals R and d at the beginning of each CRT frame to obtain the origin coordinates of the window 18 to be displayed on-screen for that frame. The circuitry 16B also ascertains whether a new strip 20 must be erased and rewritten in the image memory 15. If so, the direction signal d on the line 26 is utilized by the controller 17 (FIG. 11) to aid in ascertaining the origin coordinates of the strip to be rewritten.

To determine whether panning already is in progress, the contents of a latch 27 (FIG. 9) which stores the current rate signal R is compared with zero in a comparator 28. If no panning is in progress, R=0 and a high signal is provided as a first input to an AND-gate 29 which is enabled by the RNP pulse on the line 24.

If no strip rewriting is in progress, the contents S of a register 30 (FIG. 11) will be zero. Accordingly, a high signal representing this S=0 state will be present on a line 30a to the AND-gate 29. Under this condition (R=0, S=0), indicating that neither panning nor strip writing is in progress, the AND-gate 29 will provide an output signal which, after a brief delay, will cause a new panning rate signal R to be gated into the latch 27 and a new direction signal d to be gated into a latch 31. The resultant presence of these values R and d on the lines 25 and 26 then will initiate the appropriate panning operation.

A delay is introduced to enable the appropriate comparisions to be made by the circuitry 16A prior to loading the values R and d into the latches 27 and 31. The delay is implemented in part by a circuit 24a which briefly delays the RNP pulse and provides a delayed RNP' pulse on a line 24a'. The output of the AND-gate 29 triggers a one-shot 32 the output 32' of which is high for a duration of time slightly longer than the delay of the circuit 24a. Accordingly, a short time after the AND-gate 29 provides a high output, a corresponding high output is provided by an AND-gate 33 on a line 33'. This signal enables the loading of the latches 27 and 31 via respective OR-gates 34 and 35. The load pulse provided from the OR-gate 35 causes the new direction signal $d_{new}$ to be entered into the latch 31 from the register 23.

The panning rate value R that is entered into the latch 27 is determined by first ascertaining whether the new rate $R_{new}$ is equal to or less than a certain maximum pan rate $R_{max}$ that is stored in a register 36. This value $R_{max}$ is appropriately selected with regard to the capabilities of the host processor 128 to insure that strip rewriting will be completed before the window 18 pans "into" the newly rewritten strip.

The determination takes place in a circuit 37 the output of which is high if $R_{new} > R_{max}$. In this instance a gate 38 is enabled to provide the maximum pan rate value $R_{max}$ to a gate 39. On the other hand, if $R_{new}$ is equal to or below the maximum acceptable value, the resultant low output from the comparator 37 will be inverted by a circuit 40 so as to enable a gate 41 to provide the value $R_{new}$ to the gate 39. When the AND-gate 33 provides a high output on the line 33', the gate 39 is enabled via an OR-gate 42. As a result, the appropriate value $R_{new}$ or $R_{max}$ will be entered into the latch 27 and supplied as the new panning rate value R on the line 25.

In the event that panning is in progress when the new rate and direction signals are received, the AND-gate 29 will not be enabled and the latching operation just described will not occur. Rather, a high signal will occur on a line 28' indicating that $R \neq 0$. In this event, the circuitry 16A makes a determination as to whether the current direction of panning is the same as or different from the new direction specified by the $d_{new}$ signal. To this end, the $R \neq 0$ signal is supplied to an AND-gate 44 that is enabled by the RNP pulse. The current direction signal d is compared with the new direction signal $d_{new}$ in a comparator 45. If the direction is the same ($d_{new}=d$), a third high input will be provided to the AND-gate 44. The resultant output from the AND-gate 44, after being delayed by a one-shot 46 and an AND-gate 47, will provide a load signal to the latches 27 and 31 via a line 47' and the OR-gates 34, 35. This will result in the new rate value $R_{new}$ or $R_{max}$ being loaded into the latch 27 and the value of $d_{new}=d$ being reentered into the latch 31. Panning will continue in the same direction at the new rate.

If the new panning direction is different from the current panning direction, the comparator 45 will provide a high signal on a line 45' indicating this ($d_{new} \neq d$) condition. As a result, the AND-gate 48 will provide a high output on a line 48' that will halt the current panning by enabling the value "zero" to be loaded into the latch 27 via a gate 51. As a result, the value R=0, representing a zero panning rate, is supplied on the line 25, thereby effectively terminating the current panning operation.

It is possible that rewriting of a strip in the memory 15 is in progress when the new, opposite direction panning signal $d_{new}$ is received. In this event, after the current panning is halted, the circuitry 16A waits until the strip rewriting is completed before initiating panning in the new, reverse direction. To accomplish this, the signal on the line 48' sets a flip-flop 52 to the "1" state. The flip-flop 52 remains in this state until the present strip rewriting is completed. When this occurs, the signal on the line 30*a* (indicating the condition S=0) will go high, resetting the flip-flop 52 to the "zero" state. The resultant output on a line 52' will cause a trigger or differentiator circuit 53 to produce a delayed pulse on the line 47' thereby gating the new value $R_{new}$ or $R_{max}$ into the latch 27 and gating the new direction signal $d_{new}$ into the latch 31. The resultant presence of these values R and d on the lines 25 and 26 will initiate the panning operation in the new, reverse direction. If no strip writing is in progress when the reverse direction condition is detected, the flip-flop 52 will be reset to the "zero" state immediately after the pulse on the line 48' goes low. This will result in immediate initiation of panning in the new, reverse direction. In this case (S=0 when a reverse direction condition is detected), provisions may be made to insure that the next new value of $R_{new}$ or $d_{new}$ does not occur until after the output from the trigger circuit 53 has first caused loading of the latches 27 and 31.

The circuitry 16B of FIG. 10 operates at the beginning of each CRT frame to provide to the image memory access controller (such as that designated 125 in FIG. 3) the vertical origin coordinate $y_0$ of the window 18 which is to be displayed on the CRT for that frame. A corresponding circuit 16B associated with horizontal panning similiarly provides the on screen window origin coordinate $x_0$ for the horizontal axis. The circuitry 16B also determines whether a new horizontal strip 20 must be erased and rewritten, and if so provides a high signal on a line 30*b* which sets the contents of the register 30 (FIG. 11) to S=1, thereby initiating the strip erasure and rewriting operation.

Operation of the circuitry 16B is synchronized to the CRT frame rate by the receipt of frame signal F supplied by a raster controller (such as that designated in 117 FIG. 3). This frame signal F sets a flip-flop 55 to the "1" state, thereby initiating a set of operations that are carried out sequentially in accordance with the state of a counter 56. The counter 56 initially is set to zero, and then is incremented by high speed clock pulses which are gated to the counter via an AND-gate 57 that is enabled by the "1" output of the flip-flop 55. The first clock pulse sets the counter contents to "1", thereby providing an output on a line 56-1 which resets to "0" a flip-flop 58. This in turn disables a gate 59, thereby preventing transmission to the image memory access controller (IMAC) 125 of the on-screen window origin coordinate $y_0$ which is presently stored in a register 60. During the following operations of the circuitry 16B, this origin address $y_0$ is updated in accordance with the current panning rate R and direction d signals When the counter 56 reaches a count of "7", the resultant output on the line 56-7 sets the flip-flop 58 to the "1" state. This enables the gate 59 to transmit the new origin coordinate $y_0$ from the register 60 to the address bus (such as that designated 129 in FIG. 3) of the IMAC. This coordinate $y_0$, and the value $X_0$ from the horizontal panning controller, then are used appropriately to access the IMAC 125 and thereby generate the desired window display on the CRT screen. The rate of the clock pulses supplied to the counter 56 is very high compared to the video scan rate, so that updating of the origin address $y_0$ is carried out rapidly at the beginning of each CRT frame.

The available width $W_b$ of the border 19 in the +y panning direction is indicated by the contents of a register 61. The contents of this register 61 is updated each time a new strip is rewritten by the controller 17. First, the contents of the register 30 is interrogated to determine whether S=2, which indicates that a strip has been rewritten but that the border width register 61 has not yet been updated. This determination is made by an AND-gate 62 which receives as inputs the "1" output of the counter 56 on the line 56-1 and the S=2 signal on a line 30*c*. If S=2 is true, the AND-gate 62 provides a high output which enables a gate 63 to provide the current contents $W_b$ of the register 61 to an adder/subtractor circuit 64. In this circuit 64 the strip width $W_s$ is added to or subtracted from the prior border width $W_b$ depending on whether panning is in the +y or −y direction respectively, as indicated by the panning direction signal d. The addition (or subtraction) is modulo $H_m$. The sum is temporarily entered into a register 65. Thus the contents of the register 65 represents the new border width $W_b$ which is now available for +y panning as a result of completion of rewriting of a new strip in the image memory.

At the next clock pulse, when the counter 56 provides an output on a line 56-2, an AND-gate 66 enables a gate 67 to load this new value $W_b$ from the register 65 into the register 61. At the following clock pulse, when the counter 56 provides an output on the line 56-3, an AND-gate 68 supplies a signal via a line **30*d* to the register 30** which sets the value of S to zero. As noted earlier, the condition S=0 confirms that no strip writing currently is in progress.

When S is set to zero, the register 61 contains the new value $W_b$ which indicates the remaining available border width in the +y panning direction, including that provided by the newly rewritten strip if current panning is vertically upward. The available border width $W_b'$ in the −y panning direction corresponds to the value $(H_m - H_d - W_b)$. This value $W_b'$ is obtained by a subtraction circuit 61A which subtracts the value $W_b$ provided by the register 61 from the constant value $(H_m - H_d)$ which represents the total vertical width of the border 19 in the image memory 15.

Next, the panning rate signal R, which indicates the number of rows which the window 18 is to be moved for each CRT frame, is compared with the available border width $W_b$ or $W_b'$ in the direction of panning, as specified by the direction signal d. This comparision is carried out by a circuit 69 which receives the value $W_b$ via a gate **70*a* if the direction signal d indicates +y panning, and receives the value $W_b'$ via a gate 70*b* if the signal d indicates a −y panning direction. The comparator 69 provides a high signal to an AND-gate 71 if there is sufficient available border to carry out the current panning operation, (that is, if $R \leqq W_b$ or $R \leqq W_b'$ as appropriate). The AND-gate 71 is enabled when the counter 56 provides a high output on a line 56-4. At that time, if there is available border space to move the window, a flip-flop 72 is set to the "1" state providing a high output on a line 72'**.

The origin vertical coordinate $y_0$ of the window 18 to be displayed on the CRT screen now is updated in accordance with the panning rate signal R, and the remaining border width value $W_b$ is correspondingly reduced. To update the origin address, the number of rows by which the window 18 is to be moved at each frame, as designated by the panning rate signal R, is added to or subtracted from the current on-screen origin value $y_0$ in an add/subtract circuit 73. The panning direction signal d present on the line 26 is used to control whether addition or subtraction is performed. If the panning is vertically upward (as illustrated in FIGS. 7A–7D), the signal d will condition the circuit 72 to add the value R to the prior coordinate value $y_0$.

When the counter 56 steps to "5", an AND-gate 74 enables a gate 75 to provide the new origin value $y_0 \mp R$ to a temporary storage register 76. When the counter 56 steps to "6", an AND-gate 77 enables a gate 78 to enter this new origin value from the register 76 into the register 60 in place of the earlier value. At the next step of the counter 56, a high signal on line 56-7 sets the flip-flop 58 to the "1" state thereby enabling the gate 59 to supply this new on-screen window origin value $y_0$ from the register 60 to the associated image memory access controller 125. As a result, during the current CRT frame, the window 18 is accessed from the new position in the image memory 105 defined by this new vertical origin address $y_0$ and a new horizontal origin address $X_0$ provided by a corresponding controller associated with horizontal panning.

To update the remaining border width register 61, the extent of panning during the current frame, as indicated by the signal R, is subtracted from or added to the prior remaining border width $W_b$ depending respectively on whether the panning is upward or downward. This is carried out in an add/subtract circuit 79 to which the value $W_b$ is supplied via a gate 80 enabled by the output of the AND-gate 74. If panning is upward, the direction signal d conditions the circuit 79 for subtraction, and the resultant difference $(W_b - R)$ is temporarily stored in a register 81. If panning is downward, the sum $W_b + R$ is formed and stored in the register 81. When the counter 56 reaches a count of "6", the output from the AND-gate 77 enables a gate 82 to load this new value $W_b$ from the register 81 into the remaining border width register 61 in place of the prior value.

Finally, a determination is made as to whether an additional strip in the image memory 15 must now be erased and rewritten. This is done by comparing the new remaining border width value $W_b$ from the register 61 (or the value $W_b'$ from the subtraction circuit 61A) with the strip width $W_s$ in a comparator circuit 83. If panning is in the +y direction and $W_b \leqq W_s$, or if panning is downward and $W_b' \leqq W_s$, indicating that a new border strip must now be erased and rewritten, an AND-gate 84 is enabled when the counter 56 steps to "7". The resultant high output of the AND-gate 84 on the line **30*b* resets the contents of the register 30 to S=1, thereby initiating a strip erase and rewrite operation by the controller 17. When the counter 56 reaches its maximum count of "8" the resultant signal on the line 56-8 resets the counter 56 to zero, and resets the flip-flops 55 and 72 to zero, thereby terminating the operation of the circuitry 16B** until the occurrence of the next CRT frame signal.

Referring to FIG. 11, the controller 17 initiates the erasure and rewriting of a horizontal strip in the image memory 15 when the register 30 contents is set to S=1. A corresponding controller (not shown) governs the erasure and rewriting of vertical strips in the memory 15 as necessitated by horizontal panning. When S=1, a high output on a line **30*e* sets a flip-flop 85 to the "1" state. This initiates a strip erasure operation by setting a flip-flop 86 to the "1" state via a trigger or differentiator circuit 85'. A circuit 87 thereby is enabled to erase the present data from a horizontal strip (e.g., the strip 20 of FIG. 7B) of width $W_s$ in the image memory 15. The vertical origin address $Y_s$ of the horizontal strip currently to be erased (for +y panning) is stored in a register 88 and provided to the erase control circuit 87 via a bus 88'. If panning is upward, the control circuit 87 uses this original address $Y_s$ as supplied from the register 88; if panning is downward (as indicated by the direction signal d), the circuit 87 obtains the appropriate strip origin address by modulo $H_m$ subtraction of a constant (determined by the requisite border 19 width in the −y direction and the width $W_s$ of the strip) from the address supplied from the register 88. Erasure may comprise the entry of binary zero's into all of the memory 15 storage positions in the strip of width $W_s$ having the origin address supplied or computed from the contents of the register 88**.

When this erasure is complete, a high signal is provided on a line 87' which resets the flip-flop 86 to the "0" state. This in turn provides a signal via an a trigger circuit 86' and AND-gate 89 which sets a flip-flop 90 to the "1" state, thereby generating a "new data request" signal that is transmitted via a line 90' to the host processor 128. This conditions the host processor to provide the new data which is to be written into the horizontal strip that was just erased. The origin address $Y_s$ of that strip in the image memory 15 also is provided to the host processor via the bus 88', as is the panning direction signal d from the line 25. Also provided is the origin address of the strip with respect to the master image that is stored or generated in the processor 128.

In response to these data request, strip origin address and panning direction signals, the host processor 128 prepares and provides back to the controller 17 the appropriate data for rewriting the horizontal strip. The new data, and information identifying corresponding image memory 15 addresses into which that data is to be written, are sent back from the processor via a respective pair of buses 91D, 91A to a temporary storage buffer 92 in the controller 17. A "data present" signal, concomitantly transmitted from the processor 128 via a line 91P and an AND-gate 93, enables loading of the new data and address information into the buffer 92.

When sufficient new data has been received, the buffer 92 sends a write command via a line 92W to the image memory access controller 125, and concomitantly transmits the new strip data and the corresponding image memory addresses to the IMAC via the lines 92D and 92A. The IMAC 125 then accomplishes appropriate rewriting of the strip into the image memory 15. When this operation is complete, a confirmation signal from the IMAC 125 is supplied to the buffer 92 via a line 92', which results in production of a "write complete" signal on a line 92C. This signal enables an add/subtract circuit 93 to compute the origin address $Y_s$ in the image memory 15 of the next horizontal strip which is to be erased and rewritten in the direction of +y panning. To this end, the circuit 93 adds to or subtracts from the prior strip origin address $y_s$ from the register 88, the strip width value $W_s$. Addition is performed if the panning direction signal d indicates upward scanning, and subtraction is performed for a downward scan. The calculation by the circuit 93 is of modulo $W_m$, the width of the image memory.

After a slight delay provided by a circuit 94, the new current strip origin address $Y_s$ from the add/subtract circuit 93 is supplied via a gate 95 into the register 88, where it is available for use the next time that a strip erasure and rewrite operation is initiated. The "write complete" signal also sets the contents of the register 30 to the value S=2 to complete the erasure and rewrite operation.

Although the register 88 keeps track of the current origin $Y_s$ of the horizontal strip 20 in the image memory 15, it is also necessary to provide to the host processor 128 the strip origin address within the "master image" that is stored or generated therein. This master image 96 is illustrated in FIG. 12, (which corresponds to the example of FIGS. 7A through 7D). When the CRT display initially is produced at time T=0 (FIG. 7A), the portion 15' of the master image 96 that is contained in the image memory 15 is situated at an origin address $X_mY_m$ within the master image This initial origin value in the vertical direction ($Y_m$) is stored in a register 98 (FIG. 11).

During upward vertical panning, when the strip 20 (FIG. 7B) is to be rewritten, the origin address of the portion of the master image 96 which contains the requisite strip data may be computed and supplied to the host processor 128 by a circuit 98. As can be seen in FIG. 12, this data is obtained from a memory portion 20M having the origin address $X_m$, $(Y_m+H_m)$. Of course, as a result of the toroidal data entry into the image memory 15, this information from the master area 20M is entered into the "bottom" of the image memory 15 as shown by the strip 20 in FIG. 7B. That is, it is entered into a portion of the image memory having a vertical origin address Y=0, which is the value stored in the register 88.

If upward panning continues, the next strip 20' (FIGS. 7C and 7D) is obtained from an area 20M' of the master image 96 having an origin address $X_m$, $(Y_m+H_m+W_s)$. Again, this value advantageously is supplied from the computation circuit 98 via a bus 98' to the host processor 128. If the panning were downward from the initial position shown in FIG. 7A, data for the first strip to be rewritten would be obtained from the area 20M'' (FIG. 12) having an origin address $X_m$, $(Y_m-W_s)$. In general, the vertical origin address $Y_s'$ in the master image 100 of the strip to be rewritten is given by the following relationships:

For upward panning:

$$Y_s'=(Y_m+H_m)+[(N-1)\times W_s] \quad (1)$$

For downward panning:

$$Y_s'=Y_m+(N\times W_s) \quad (2)$$

where N, a signed integer, represents the net cumulative number of strips which have been rewritten during vertical panning, beginning at T=0 with the image memory 15 containing data situated at the origin $X_m$, $Y_m$ with respect to the master image 96.

The value N may be obtained by a counter 99 (FIG. 11) which initially is set to zero, and thereafter either incremented or decremented by "1" (for upward or downward panning respectively) each time a new strip is rewritten. To this end, the "set S to 1" signal on the line **30*b* is used to increment the counter 99 if the direction signal d indicates upward scanning, and to decrement the counter 99 if scanning is downward. The contents N of the counter 99, provided on a line 99' is utilized by the computation circuitry 98** to compute the new strip origin address in the master image in accordance with equation (1) or (2). Which equation is implemented depends on the panning direction specified by the signal d.

If horizontal panning has resulted in the erasure and rewriting of one or more vertical strips (e.g., the strips 20A, 20C of FIGS. 8C and 8D) in the memory 15, the corresponding horizontal offset in the master image 96 must be taken into account in requesting new rewrite data from the host processor 128. This computation also may be carried out in the circuit 98. The horizontal origin coordinate $X_s'$ of a horizontal strip to be rewritten by the controller 17 can be computed from the inital horizontal address $X_m$ and the net number N' of vertical strips that have since been rewritten. This number N' is obtained from a counter in the vertical strip rewrite controller (not shown) which corresponds to the counter 99 in the horizontal strip controller 17 of FIG.

11. The current horizontal strip coordinate $X_s'$ then is given by:

$$X_s' = X_m + (N' \times W_s)$$

This calculation is performed by the circuit 98 and supplied to the host processor 128 together with the vertical origin. $Y_s'$ via the bus 98'.

In the event that during the rewriting of a horizontal strip 20, 20' etc. the erasure and rewriting of a vertical strip should subsequently begin, it is necessary to delete the overlap region (e.g., 20A', 20C', 20E' of FIGS. 8C–8E) from the horizontal strip data which is rewritten into the image memory 15 under control of the horizontal strip controller 17. In the embodiment of FIG. 11, this is done by supplying to the IMAC 125 a "delete overlap" command together with the horizontal origin address of the region to be deleted. The IMAC then will not enter into the image memory data for the horizontal strip 20, 20' being rewritten for those positions having horizontal addresses between $X_s'$ (the origin of the vertical strip which currently is being erased and rewritten) and $X_s'+W_s$ if horizontal panning is to the right, or $X_s'+W_m-W_s$ if horizontal panning is to the left. The horizontal panning direction is indicated by a signal $d_h$ from the vertical strip rewrite controller.

The deletion command may be obtained from a flip-flop 100 which is set to "1" by the "set S to 1" signal on the line 30*b* which occurs at the beginning of each erasure and rewriting operation of the controller 17. If during this rewrite operation a vertical strip rewrite is initiated (such as the strip 20A shown in FIG. 8C), the "set S to 1" signal from the vertical strip rewrite controller (not shown) is used to reset the flip-flop 100 to the "O" state. The resultant "O' on a line 100' provides the requisite "delete overlap" command signal to the IMAC 125. The vertical strip origin coordinate $X_s$ (in the memory 15) of the currently rewritten vertical strip is obtained from the register in the vertical strip rewrite controller corresponding to the register 88 and supplied via a line 88*a* to the IMAC 125. Advantageously, the erasure and rewrite time for a vertical strip will be substantially the same as for a horizontal strip. Therefore, the rewriting of at most one vertical strip will begin during the rewriting of any horizontal strip. However, appropriate logic may be employed to prevent a "race" condition from occurring in the event that two (or more) strip rewrite operations are initiated in one axis during a single strip rewrite in the other axis.

Various modifications may be made without departing from the scope of the present invention. For example, the image memory 15 or 105 may consist of a bit-addressed or linear memory, instead of one which is directly addressed by x and y coordinates. In such a linear or bit-addressed memory, data in the "bottom" row (corresponding to y=0 of the memory 15 in FIGS. 7A through 7D) may be accessed by the addresses 0 through $(W_m-1)$, the second row by the addresses $W_m$ through $(2W_m-1)$, and the $n^{th}$ row by the values $(n-1)W_m$ through $(n\ W_m-1)$.

The panning regions on opposite sides of the displayed window need not be maintained equal in width. For example, if it is known that panning will continue in a certain direction (e.g., to the right or upward) for a certain minimum duration of time, the border or panning area in that direction may be wider than the panning border in the opposite direction. This may allow for more rapid panning in the given direction than would be possible if equal borders were maintained on both sides of the displayed window.

Figure 13A:
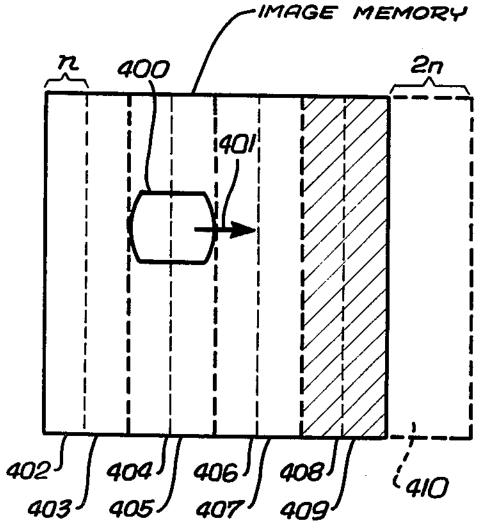
FIGS. 13*a* and 13*b* are pictorial illustrations showing memory organization in a normal panning embodiment of the invention.

FIGS. 13 and 14 show alternate methods of managing strips for panning. Referring to FIG. 13A, the screen 400 displays information contained in the image memory and panning is done in a direction shown by an arrow 401. The image memory is comprised of 8 strips 402–409, each having a width of n pixels. The screen 400 is shown to represent the display of information contained in the strips 404 and 405. As the screen begins to move into the strip 406, picture information from the host processor starts to be written into the strips 408 and 409, i.e., the start of writing of information into the image memory precedes the screen by a distance of 2n pixels or 2 strips. The speed of panning has been chosen to be slow enough so that writing into strips 408 and 409 will be complete before the screen 400 traverses strips 406 and 407. Picture information representing the image to the right of the right edge of the image memory will later be added at 410. This information is currently stored in the host processor.

Figure 13B:
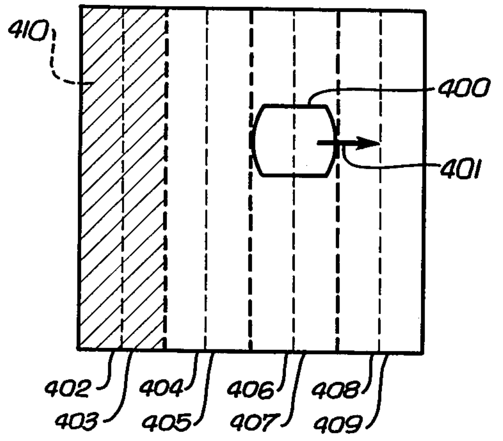

Referring to FIG. 13B, when the screen begins to move into the strip 408, data from the host processor representing the area 410 will start to be written into the strips 402 and 403 in a toroidal fashion as described previously. Thus, the writing of information into the image memory from the host processor will precede the screen 400 by a distance of 2n pixels. That is, a border of 2n pixels is provided on either side of the screen and information is added to the image memory as panning is accomplished (in a toroidal fashion when the distance between the screen and the edge of the image memory becomes less than 2n pixels).

In FIG. 13, 2 strips representing information to the left of the screen 400 are maintained in the image memory (402 and 403 in FIG. 13A and 404 and 405 in FIG. 13B). These strips enable instantaneous panning to either the left or right to be accomplished, since image information on both sides of the screen 400 is maintained in the image memory.

Figure 14A:
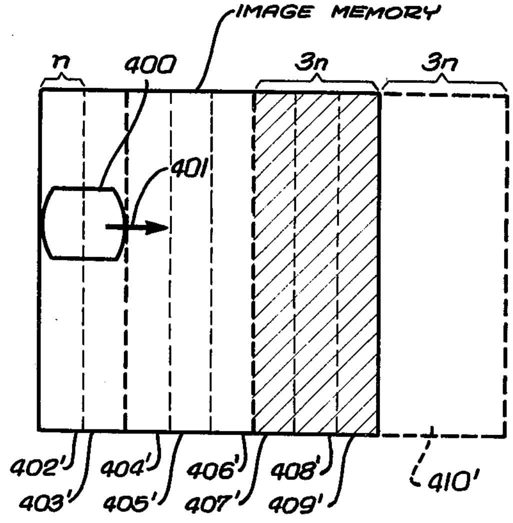
FIGS. 14*a* and 14*b* are pictorial illustrations showing memory organization in a fast panning embodiment of the invention.

Referring now to FIG. 14A, the image memory is shown as being comprised of 8 strips 402'–409', each having a width of 2n pixels (i.e., the image memory is identical to that of FIG. 13). In this embodiment, however, the strips are utilized in a different manner to facilitate high speed panning. Instead of providing a border of information on either side of the screen 400, the left hand border is dispensed with and the right hand border is increased. In FIG. 14A, the screen is initially displaying information in strips 402' and 403'. Picture information is also contained in the strips 404'–406'. As the screen begins to move into the strip 404', information will begin to be written into the strips 407'–409'. Thus, whereas in FIG. 13 the border and rewrite strips were 2n pixels wide, in FIG. 14 they are 3n pixels wide. Picture data representing the image to the right of the right edge of the image memory will later be added at 410'. This information is currently stored in the host processor.

Figure 14B:
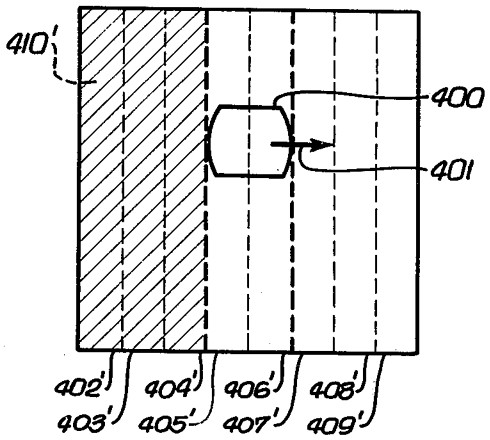

Referring now to FIG. 14B, as the screen 400 begins to move into the strip 407' (i.e., it reaches a distance of 3n pixels from the edge of the image memory), the image data 410' will begin to be written into the strips 402'–404' in a toroidal fashion. It should be noted that at this point, no picture information representing the image to the left of the screen 400 is contained in the image memory. Because of this, instantaneous panning to the left is not possible in this configuration. If the panning direction were reversed, a delay would be required to enable new picture information representing the image to the left of the screen 400 to be written into the image memory.

In the embodiment of FIG. 14, it is assumed that panning will be accomplished primarily to the right. The lack of a border to the left of the screen 400 thus does not present substantial problems. The maximum panning speed is a function of how fast information can be transferred from the host processor into the image memory. In the embodiment of FIG. 13, a new rewrite strip must be entered into the image memory in less time than it takes the screen to traverse 2 strips (i.e., the width of the border provided). In contrast, with the embodiment of FIG. 14, new information must be added to the image memory in the time that it takes the screen to traverse 3 strips. Since the strip writing time is essentially independent of the strip width, an approximately 50% greater panning speed can be obtained with the embodiment of FIG. 14. This is so even though the size of the image memory is the same as that of FIG. 13. The configuration of FIG. 13 is advantageous because, although panning generally occurs in a single direction, the provision of a border on both sides of the picture facilitates adjustment of the position of the picture by small amounts of reverse panning movement at any time.

Figure 15:
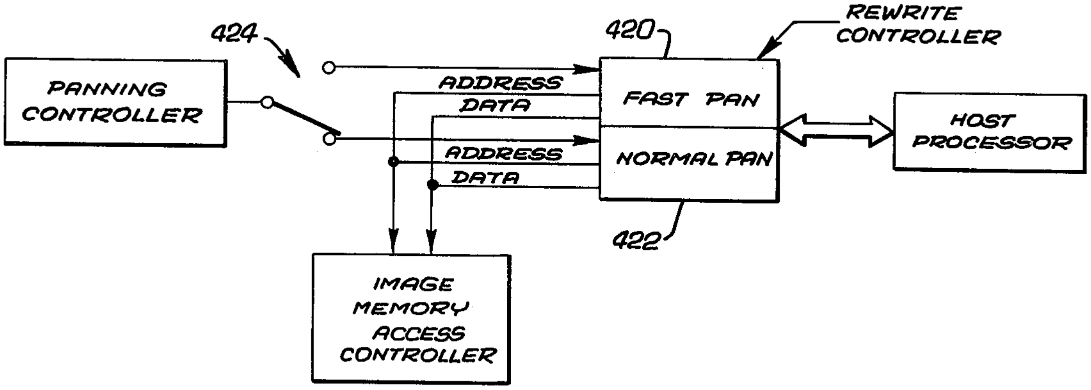
FIG. 15 is a partial block diagram of an embodiment of the invention which can operate in either a normal panning or fast panning mode.

The embodiment of the invention shown in FIG. 15 can operate in either a normal panning or fast panning mode, as selected by a switch 424. When this switch is in the position shown, a rewrite controller 422 acts as interface between the host computer and the image memory access controller. When the switch 424 is set to its alternate position, the fast panning rewrite controller 420 is employed. Both of the controllers 420 and 422 may be configured like other embodiments of the rewrite controller described hereinabove, but adapted to operate respectively at normal and faster than normal rates.

I claim:

1. In a raster scan video display system having a display device, a panning control system comprising:

image memory means for storing graphic data to be displayed, said image memory means being capable of storing more graphic data than can be simultaneously displayed on said display device, said image memory means being accessible in accordance with a specified coordinate system having defined coordinate boundaries;

raster readout control means for reading out graphic image data from a portion of said image memory means in raster scanning order and in synchronism with the video timing of said display device beginning at an arbitrarily specifiable origin address, said control means recognizing during raster readout when a coordinate boundary is reached and continuing said readout from the corresponding opposite boundary, the read out image data being translatable into a video graphics signal to said display device; and rewrite means for entering data into an area of said image memory means outside of the portion from which said data is read out, so that said entered data will be available for inclusion in the read out image data upon subsequent raster readout from a different origin address.

2. A system according to claim 1 wherein said specified coordinate system is a rectangular coordinate system.

3. A system according to claim 2 wherein said raster readout control means, when reaching a coordinate boundary, continues said readout in a wraparound manner.

4. A system according to claim 1, comprising:

panning means, cooperating with said raster readout control means and said rewrite means, for providing to said raster readout control means a sequence of sucessively different origin addresses, said raster readout control means thereby sucessively accessing image data from corresponding different portions of said image memory means, and for indicating to said rewrite means the areas in said image memory means which are not being read out by said raster readout control means during each current raster readout.

5. A system according to claim 4, comprising:

timing means, cooperating with said rewrite means and said panning means, for causing said rewrite means to complete entry of data into certain areas of said image memory means in advance of inclusion of said certain areas in the portion of said image memory means that is read out as a result of a later provided origin address.

6. A system according to claim 4 or 5 wherein said image memory includes a border region contiguously surrounding the portion from which image data currently is being read out by said readout control means, said border region containing image data which comprises a graphic continuation of the currently read out image data, and wherein the area into which data is entered by said rewrite means is separated from said currently read out portion by said border region.

7. A system according to claim 4 wherein said panning means comprises operator input means for specifying a desired origin address or desired direction of origin address movement.

8. A system according to claim 4 wherein said video display system provides a raster scan frame signal for specifying the initiation of a CRT raster refresh and wherein said panning means provides for each such frame signal a display memory origin address.

9. A system according to claim 4 wherein said panning means cooperates with said rewrite means to maintain unchanged the image data stored in said memory means in a border region adjacently surrounding the portion from which graphic image data currently is being accessed by said raster readout control means.

10. A system according to claim 4 wherein said panning means limits the rate of change of origin addresses to be used by said raster readout means in cooperation with the rate at which said rewrite means may enter data in said image memory means.

11. A system according to claim 4 wherein said image memory includes a border region contiguously surrounding the portion from which image data currently is being read out by said readout control means, said border region containing image data which comprises a graphic continuation of the currently read out image data, wherein the area into which data is entered by said rewrite means is separated from said currently read out portion by said border region, and wherein said border region has substantially the same amount of memory space on opposite sides of the currently read out image data.

12. A system according to claim 4 wherein said image memory includes a border region contiguously and partially surrounding the portion from which image data currently is being read out by said readout control means, said border region containing image data which comprises a graphic continuation of the currently read out image data in at least one direction, wherein the area into which data is entered by said rewrite means is separate from said currently read out portion and said border region, and wherein said panning means provides origin addresses which cause image data to be accessed from said border region.

13. A system according to claim 1 having a host processor means for providing requested data for any portion of said image, wherein said rewrite means requests data from said host processor means concerning portions of said image and enters said data into said image memory means.

14. In a raster scan video display system having an image memory storing data representing a display portion of an image, said image memory being accessable in accordance with a specified access coordinate system with defined coordinate boundaries, raster readout control means for reading out display portion data from said image memory in a raster scanning order and for formatting a video signal representative of said display portion, and rewrite means for entering data concerning portions of said image into said image memory, the improvement wherein:

said image memory stores data representing border portions of said image surrounding said display portion, said system further comprising:

toroidal access means for converting coordinate addresses outside said defined coordinate boundaries to addresses within said boundaries in a toroidal wraparound manner;

said display portion being locatable at an arbitrarily specifiable origin address in said image memory, data representing said border portions toroidally surrounding data representing said display portion;

said raster readout control means cooperating with said toroidal access means to access said display portion data in a toroidal manner beginning from said arbitraily specifiable origin address;

said rewrite means cooperating with said toroidal access means to toroidally enter data representing said border portions into regions of said image memory surrounding the region containing said display portion data.

15. The improvement of claim 14 further comprising:

panning means, cooperating with said raster readout control means and said rewrite means, for providing to said raster readout control means a sequence of successively different origin addresses in said image memory, said raster readout control means thereby sucessively accessing display portion image data from corresponding different portions of said image memory, and for indicating to said rewrite means the areas in said image memory which are not being accessed by said raster control means during each current raster readout.

16. The improvement of claim 15 wherein said panning means comprises operator input means for specifying a desired origin address or desired direction of origin address movement.

17. The improvement of claim 15 wherein said rewrite means, in cooperation with said panning means, maintains in said image memory data representing a border portion of said image surrounding said display portion.

18. In a raster graphics display system having a display device and operable with an external source of graphic image data, a toroidal pan system comprising:

a "toroidal" image memory and an associated memory access controller, said memory storing graphic image data in storage locations that are accessable in response to orthogonal coordinate addresses supplied to said controller, said controller operating in modulo fashion to continue memory access in wraparound fashion from one boundary when an opposite boundary of said memory is reached;

raster access control means, cooperating with said memory access controller, for reading out in raster fashion graphics image data from a selectively locatable portion of said memory, said portion corresponding in storage size to an image that can be fully displayed on said display device, said portion being less than the full size of said memory, and for converting the read out image data to a raster graphics output signal for said display device;

a pan controller, cooperating with said raster access control means, for successively providing a set of sequentially different image location signals in response to which said raster access control means will successively read out image data from a corresponding set of sequentially different portions of said image memory, thereby producing a pan effect on said display device; and rewrite means, cooperating with said pan controller and said memory access controller, for obtaining new graphic image data from said external source and for entering said new data into storage locations in said memory which are spaced from the portion of said memory that is concurrently being read out by said raster access control means.

19. A toroidal pan system according to claim 18 wherein the region of said image memory between said concurrently read out portion and said new data entry storage locations consists of a border region contiguously surrounding said concurrently read out portion, said border region containing graphic image data that forms a continuation of the image represented by the data stored in said concurrently read out portion, and wherein said pan controller is configured to provide as the next successive image location signal a signal which will cause said raster access control means to read out image data from a new memory position that includes only storage locations which were included in the previous portion and the border region surrounding that previous portion.

20. A toroidal pan system according to claim 19 further comprising:

timing means, cooperating with said pan controller and said rewrite means and responsive to said successively provided image location signals, for causing said rewrite means to enter new data into corresponding new data entry storage locations at a rate that is sufficiently fast so as to conclude said data entry prior to readout by said raster access control means of a position established by said location signal that includes said corresponding new data entry storage locations, whereby the panning appears to continue smoothly across an effective image that is larger than the storage capacity of said image memory.

21. A toroidal panning system in which a graphics display is generated in raster fashion by readout of pixel image data from a window portion of an image memory, and operable with a host processor which supplies data representing a master image much larger than can be stored at one time in said image memory, characterized in that;

said image memory stores additional pixel data representing regions of said master image forming a border contiguous to said window portion, said pixel data being stored in toroidal order so that said window portion and contiguous border pixel data continue in wraparound fashion from one image memory boundary to the opposite boundary, pixel data being read out from said image memory in corresponding toroidal wraparound order beginning from a specified window portion origin address, panning controller means for specifying successive origin addresses from which corresponding successive graphic displays are generated, said successive graphic displays including pixel data from said contiguous border regions, successive origin addresses being specified in toroidal wraparound fashion so that if an origin address is outside an image memory boundary the address is specified instead in modulo fashion with respect to the opposite boundary, and strip erase and rewrite controller means, cooperating with said panning controller means, for determining when the width of the effective contiguous border region in the panning direction identified by successive origin addresses is less than a certain value, and for thereupon erasing a contiguous strip of said image memory and entering into said strip additional contiguous pixel data obtained from said host processor, so that said strip continues and effectively enlarges said contiguous border region, said strip erasure and rewriting also being performed in toroidal wraparound fashion.

22. A toroidal panning display system according to claim 19 wherein there is a separate like panning controller means and a separate like strip erase and rewrite controller means for respective control of vertical and horizontal panning, together with:

rewrite inhibit means, interconnecting the separate vertical and horizontal rewrite controller means, for ascertaining when one of said rewrite controller means initiates erasure and rewriting of a strip in one horizontal or vertical direction that partially overlaps a strip currently being rewritten in the other direction, and for deleting the rewriting of the overlap region by one of said rewrite controller means.

23. The toroidal panning system of claim 21 wherein the panning system is switchable between a normal mode in which the direction of panning is immediately reversible and a high speed mode in which the direction of panning is not immediately reversible, wherein the certain value width of the effective contiguous border region has a first predetermined value when the system is in the normal mode and a second, larger predetermined value when the system is in the high speed mode, wherein said contiguous strip of image memory has a first width when the system is in the normal mode and a second, wider width when the system is in the high speed mode.

24. The toroidal panning system of claim 23 wherein the second predetermined value and second width are one and one-half times the first predetermined value and first width, respectively.

25. The toroidal panning system of claim 21 wherein said border portion occupies space in the image memory on opposite sides of the window portion to thereby facilitate panning in either forward or reverse directions.

26. The toroidal panning system of claim 21 wherein the border portion occupies space in the image memory on one side of the window portion but not on the opposite side of the window portion, wherein panning is done primarily in the direction of the border portion, whereby the size of the border portion and the contiguous strip can be maximized to thereby facilitate maximum panning speed.

27. A toroidal pan graphics display system utilizing an image memory that is addressable in one-to-one correspondence to vertical and horizontal orthogonal coordinates, said image memory storing pixel data representing a portion of a larger master image supplyable from a host processor, a display device generating a graphics display from a window portion of said image memory, there being a border portion of said image memory surrounding said window portion and containing image data contiguous thereto, panning of said image being directed by supplied panning rate and panning direction signals, comprising:

first means for comparing said rate and direction signals with the prior rate and direction signals for panning currently under way, and for selectively providing the new values in place of the former values, second means, operative at each successive graphics display generation, for modifying the origin address of said window portion in accordance with the newly provided rate and direction signals, said origin address being modified modulo the respective height or width dimension of said image memory, so that the window portion is accessed in toroidal wraparound fashion, third means, cooperating with said second means, for ascertaining whether the border area remaining after generation of a graphics display from the window portion specified by the modified origin address in the direction of panning is greater than a certain value, and fourth means, responsive to said determination, for erasing the pixel data in a contiguous strip of said image memory adjacent to the boundary between the opposite edges of the toroidally stored image data in said memory, and for accessing contiguous pixel data from the master image in said host processor for entry into said strip so as to effectively enlarge the contiguous border adjacent said window portion in the direction of panning.

28. A toroidal panning graphics display system comprising:

an image memory, image data contained in said memory being organized in toroidal, wraparound fashion from one border around to the opposite border, there being a line of demarcation where image data at one edge of the image meets the wrapped around image data from the opposite edge of the stored image, display means for accessing data in toroidal wraparound fashion from a window area of said image memory to produce a corresponding display, there being an unaccessed border area in said image memory surrounding said window area, panning means, cooperating with said display means, for changing the location of successively accessed windows in toroidal wraparound fashion, so that the resultant displays exhibit a panning effect, and strip rewrite control means, cooperating with said panning means, for erasing and rewriting new image data into a strip of the image memory adjacent to said line of demarcation when, as a result of said panning, the width of available border area in the direction of panning is decreased below a certain value, the newly rewritten strip thereby effectively changing the line of demarcation, increasing the border area in said panning direction, and decreasing the border area in the opposite direction.

* * * * *